United States Patent
Schwesig et al.

(10) Patent No.: US 10,459,080 B1
(45) Date of Patent: Oct. 29, 2019

(54) RADAR-BASED OBJECT DETECTION FOR VEHICLES

(71) Applicant: Google Inc., Mountain View, CA (US)

(72) Inventors: Carsten C. Schwesig, San Francisco, CA (US); Ivan Poupyrev, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 349 days.

(21) Appl. No.: 15/287,155

(22) Filed: Oct. 6, 2016

Related U.S. Application Data

(60) Provisional application No. 62/237,975, filed on Oct. 6, 2015.

(51) Int. Cl.
  *G01S 13/93* (2006.01)
  *G01S 7/41* (2006.01)

(52) U.S. Cl.
  CPC ............ *G01S 13/931* (2013.01); *G01S 7/412* (2013.01); *G01S 2013/9357* (2013.01)

(58) Field of Classification Search
  CPC . G01S 13/931; G01S 7/412; G01S 2013/9357
  USPC .......................................................... 342/70
  See application file for complete search history.

(56) References Cited

U.S. PATENT DOCUMENTS

| | | | |
|---|---|---|---|
| 3,610,874 A | 10/1971 | Gagliano | |
| 3,752,017 A | 8/1973 | Lloyd et al. | |
| 3,953,706 A | 4/1976 | Harris et al. | |
| 4,104,012 A | 8/1978 | Ferrante | |
| 4,654,967 A | 4/1987 | Thenner | |
| 4,700,044 A | 10/1987 | Hokanson et al. | |
| 4,795,998 A | 1/1989 | Dunbar et al. | |
| 4,838,797 A | 6/1989 | Dodier | |

(Continued)

FOREIGN PATENT DOCUMENTS

| | | |
|---|---|---|
| CN | 1462382 | 12/2003 |
| CN | 101751126 | 6/2010 |

(Continued)

OTHER PUBLICATIONS

"Final Office Action", U.S. Appl. No. 14/518,863, dated Apr. 5, 2018, 21 pages.

(Continued)

*Primary Examiner* — Frank J McGue
(74) *Attorney, Agent, or Firm* — Colby Nipper

(57) ABSTRACT

This document describes techniques and devices for radar-based object detection for vehicles. A radar-based object detection component implemented in a vehicle is configured to detect characteristics of persons within the vehicle, such as a driver or other passengers. Based on the detected characteristics, an activity of the person can be determined and various operations can be initiated based on the activity, such as initiating a warning when the driver is not paying attention to driving or automatically slowing down the vehicle. In some cases, the radar-based object detection component can also be implemented to detect characteristics of objects positioned external to the vehicle, such as pedestrians, other vehicles, or objects in the road. The radar-based object detection component may also be implemented to authenticate a driver of the vehicle, such as by detecting biometric characteristics of the driver or recognizing a series of gestures corresponding to an authentication sequence.

20 Claims, 6 Drawing Sheets

(56) References Cited

U.S. PATENT DOCUMENTS

| | | | |
|---|---|---|---|
| 5,016,500 A | 5/1991 | Conrad et al. | |
| 5,121,124 A | 6/1992 | Spivey et al. | |
| 5,298,715 A | 3/1994 | Chalco et al. | |
| 5,341,979 A | 8/1994 | Gupta | |
| 5,410,471 A | 4/1995 | Alyfuku et al. | |
| 5,468,917 A | 11/1995 | Brodsky et al. | |
| 5,564,571 A | 10/1996 | Zanotti | |
| 5,656,798 A | 8/1997 | Kubo et al. | |
| 5,724,707 A | 3/1998 | Kirk et al. | |
| 5,798,798 A | 8/1998 | Rector et al. | |
| 6,032,450 A | 3/2000 | Blum | |
| 6,037,893 A | 3/2000 | Lipman | |
| 6,080,690 A | 6/2000 | Lebby et al. | |
| 6,101,431 A | 8/2000 | Niwa et al. | |
| 6,210,771 B1 | 4/2001 | Post et al. | |
| 6,254,544 B1 | 7/2001 | Hayashi | |
| 6,313,825 B1 | 11/2001 | Gilbert | |
| 6,340,979 B1 | 1/2002 | Beaton et al. | |
| 6,386,757 B1 | 5/2002 | Konno | |
| 6,440,593 B2 | 8/2002 | Ellison et al. | |
| 6,492,980 B2 | 12/2002 | Sandbach | |
| 6,493,933 B1 | 12/2002 | Post et al. | |
| 6,513,833 B2 * | 2/2003 | Breed | B60J 10/00 280/735 |
| 6,513,970 B1 | 2/2003 | Tabata et al. | |
| 6,524,239 B1 | 2/2003 | Reed et al. | |
| 6,543,668 B1 | 4/2003 | Fujii et al. | |
| 6,616,613 B1 | 9/2003 | Goodman | |
| 6,711,354 B2 | 3/2004 | Kameyama | |
| 6,717,065 B2 | 4/2004 | Hosaka et al. | |
| 6,802,720 B2 | 10/2004 | Weiss et al. | |
| 6,833,807 B2 | 12/2004 | Flacke et al. | |
| 6,835,898 B2 | 12/2004 | Eldridge et al. | |
| 6,854,985 B1 | 2/2005 | Weiss | |
| 6,929,484 B2 | 8/2005 | Weiss et al. | |
| 6,970,128 B1 | 11/2005 | Dwelly et al. | |
| 6,997,882 B1 | 2/2006 | Parker et al. | |
| 7,019,682 B1 | 3/2006 | Louberg et al. | |
| 7,134,879 B2 | 11/2006 | Sugimoto et al. | |
| 7,158,076 B2 | 1/2007 | Fiore et al. | |
| 7,164,820 B2 | 1/2007 | Eves et al. | |
| 7,194,371 B1 | 3/2007 | McBride et al. | |
| 7,205,932 B2 | 4/2007 | Fiore | |
| 7,223,105 B2 | 5/2007 | Weiss et al. | |
| 7,230,610 B2 | 6/2007 | Jung et al. | |
| 7,249,954 B2 | 7/2007 | Weiss | |
| 7,266,532 B2 | 9/2007 | Sutton et al. | |
| 7,299,964 B2 | 11/2007 | Jayaraman et al. | |
| 7,310,236 B2 | 12/2007 | Takahashi et al. | |
| 7,317,416 B2 | 1/2008 | Flom et al. | |
| 7,348,285 B2 | 3/2008 | Dhawan et al. | |
| 7,365,031 B2 | 4/2008 | Swallow et al. | |
| 7,421,061 B2 | 9/2008 | Boese et al. | |
| 7,462,035 B2 | 12/2008 | Lee et al. | |
| 7,528,082 B2 | 5/2009 | Krans et al. | |
| 7,544,627 B2 | 6/2009 | Tao et al. | |
| 7,578,195 B2 | 8/2009 | DeAngelis et al. | |
| 7,644,488 B2 | 1/2010 | Aisenbrey | |
| 7,647,093 B2 | 1/2010 | Bojovic et al. | |
| 7,670,144 B2 | 3/2010 | Ito et al. | |
| 7,677,729 B2 | 3/2010 | Vilser et al. | |
| 7,691,067 B2 | 4/2010 | Westbrook et al. | |
| 7,698,154 B2 | 4/2010 | Marchosky | |
| 7,791,700 B2 | 9/2010 | Bellamy | |
| 7,834,276 B2 | 11/2010 | Chou et al. | |
| 7,845,023 B2 | 12/2010 | Swatee | |
| 7,941,676 B2 | 5/2011 | Glaser | |
| 7,952,512 B1 | 5/2011 | Delker et al. | |
| 7,999,722 B2 | 8/2011 | Beeri et al. | |
| 8,062,220 B2 | 11/2011 | Kurtz et al. | |
| 8,063,815 B2 | 11/2011 | Valo et al. | |
| 8,169,404 B1 | 5/2012 | Boillot | |
| 8,179,604 B1 | 5/2012 | Prada Gomez et al. | |
| 8,193,929 B1 | 6/2012 | Siu et al. | |
| 8,199,104 B2 | 6/2012 | Park et al. | |
| 8,282,232 B2 | 10/2012 | Hsu et al. | |
| 8,289,185 B2 | 10/2012 | Alonso | |
| 8,301,232 B2 | 10/2012 | Albert et al. | |
| 8,314,732 B2 | 11/2012 | Oswald et al. | |
| 8,334,226 B2 | 12/2012 | Nhan et al. | |
| 8,341,762 B2 | 1/2013 | Balzano | |
| 8,344,949 B2 | 1/2013 | Moshfeghi | |
| 8,367,942 B2 | 2/2013 | Howell et al. | |
| 8,475,367 B1 | 7/2013 | Yuen et al. | |
| 8,505,474 B2 | 8/2013 | Kang et al. | |
| 8,509,882 B2 | 8/2013 | Albert et al. | |
| 8,514,221 B2 | 8/2013 | King et al. | |
| 8,527,146 B1 | 9/2013 | Jackson et al. | |
| 8,549,829 B2 | 10/2013 | Song et al. | |
| 8,560,972 B2 | 10/2013 | Wilson | |
| 8,562,526 B2 | 10/2013 | Heneghan et al. | |
| 8,569,189 B2 | 10/2013 | Bhattacharya et al. | |
| 8,614,689 B2 | 12/2013 | Nishikawa et al. | |
| 8,655,004 B2 | 2/2014 | Prest et al. | |
| 8,700,137 B2 | 4/2014 | Albert | |
| 8,758,020 B2 | 6/2014 | Burdea et al. | |
| 8,759,713 B2 | 6/2014 | Sheats | |
| 8,764,651 B2 | 7/2014 | Tran | |
| 8,785,778 B2 | 7/2014 | Streeter et al. | |
| 8,790,257 B2 | 7/2014 | Libbus et al. | |
| 8,814,574 B2 | 8/2014 | Selby et al. | |
| 8,819,812 B1 | 8/2014 | Weber et al. | |
| 8,854,433 B1 | 10/2014 | Rafii | |
| 8,860,602 B2 | 10/2014 | Nohara et al. | |
| 8,921,473 B1 | 12/2014 | Hyman | |
| 8,948,839 B1 | 2/2015 | Longinotti-Buitoni et al. | |
| 9,055,879 B2 | 6/2015 | Selby et al. | |
| 9,093,289 B2 | 7/2015 | Vicard et al. | |
| 9,125,456 B2 | 9/2015 | Chow | |
| 9,141,194 B1 | 9/2015 | Keyes et al. | |
| 9,148,949 B2 | 9/2015 | Guofu et al. | |
| 9,223,494 B1 | 12/2015 | Desalvo et al. | |
| 9,229,102 B1 | 1/2016 | Wright et al. | |
| 9,230,160 B1 | 1/2016 | Kanter | |
| 9,235,241 B2 | 1/2016 | Newham et al. | |
| 9,316,727 B2 | 4/2016 | Sentelle et al. | |
| 9,331,422 B2 | 5/2016 | Nazzaro et al. | |
| 9,335,825 B2 | 5/2016 | Rautianinen et al. | |
| 9,346,167 B2 | 5/2016 | O'Connor et al. | |
| 9,354,709 B1 | 5/2016 | Heller et al. | |
| 9,508,141 B2 | 11/2016 | Khachaturian et al. | |
| 9,569,001 B2 | 2/2017 | Mistry et al. | |
| 9,575,560 B2 | 2/2017 | Poupyrev et al. | |
| 9,588,625 B2 | 3/2017 | Poupyrev | |
| 9,594,443 B2 | 3/2017 | VanBlon et al. | |
| 9,600,080 B2 | 3/2017 | Poupyrev | |
| 9,693,592 B2 | 7/2017 | Robinson et al. | |
| 9,746,551 B2 | 8/2017 | Scholten et al. | |
| 9,766,742 B2 | 9/2017 | Papakostas | |
| 9,778,749 B2 | 10/2017 | Poupyrev | |
| 9,811,164 B2 | 11/2017 | Poupyrev | |
| 9,817,109 B2 | 11/2017 | Saboo et al. | |
| 9,837,760 B2 | 12/2017 | Karagozler et al. | |
| 9,848,780 B1 | 12/2017 | DeBusschere et al. | |
| 9,921,660 B2 | 3/2018 | Poupyrev | |
| 9,933,908 B2 | 4/2018 | Poupyrev | |
| 9,947,080 B2 | 4/2018 | Nguyen et al. | |
| 9,971,414 B2 | 5/2018 | Gollakota et al. | |
| 9,971,415 B2 | 5/2018 | Poupyrev et al. | |
| 9,983,747 B2 | 5/2018 | Poupyrev | |
| 9,994,233 B2 * | 6/2018 | Diaz-Jimenez | B60W 50/10 |
| 10,016,162 B1 | 7/2018 | Rogers et al. | |
| 10,034,630 B2 * | 7/2018 | Lee | A61B 5/18 |
| 10,073,590 B2 | 9/2018 | Dascola et al. | |
| 10,080,528 B2 | 9/2018 | DeBusschere et al. | |
| 10,082,950 B2 | 9/2018 | Lapp | |
| 10,088,908 B1 | 10/2018 | Poupyrev et al. | |
| 10,139,916 B2 | 11/2018 | Poupyrev | |
| 10,155,274 B2 | 12/2018 | Robinson et al. | |
| 10,175,781 B2 | 1/2019 | Karagozler et al. | |
| 10,203,763 B1 | 2/2019 | Poupyrev et al. | |
| 10,222,469 B1 | 3/2019 | Gillian et al. | |
| 10,241,581 B2 | 3/2019 | Lien et al. | |
| 10,268,321 B2 | 4/2019 | Poupyrev | |

(56) References Cited

U.S. PATENT DOCUMENTS

| | | |
|---|---|---|
| 10,285,456 B2 | 5/2019 | Poupyrev et al. |
| 10,300,370 B1 | 5/2019 | Amihood et al. |
| 10,310,620 B2 | 6/2019 | Lien et al. |
| 10,310,621 B1 | 6/2019 | Lien et al. |
| 10,379,621 B2 | 8/2019 | Schwesig et al. |
| 10,401,490 B2 | 9/2019 | Gillian et al. |
| 10,409,385 B2 | 9/2019 | Poupyrev |
| 2001/0035836 A1 | 11/2001 | Miceli et al. |
| 2002/0009972 A1 | 1/2002 | Amento et al. |
| 2002/0080156 A1 | 6/2002 | Abbott et al. |
| 2002/0170897 A1 | 11/2002 | Hall |
| 2003/0005030 A1 | 1/2003 | Sutton et al. |
| 2003/0071750 A1 | 4/2003 | Benitz |
| 2003/0093000 A1 | 5/2003 | Nishio et al. |
| 2003/0100228 A1 | 5/2003 | Bungo et al. |
| 2003/0119391 A1 | 6/2003 | Swallow et al. |
| 2003/0122677 A1 | 7/2003 | Kail |
| 2004/0009729 A1 | 1/2004 | Hill et al. |
| 2004/0102693 A1 | 5/2004 | Jenkins |
| 2004/0249250 A1 | 12/2004 | McGee et al. |
| 2004/0259391 A1 | 12/2004 | Jung et al. |
| 2005/0069695 A1 | 3/2005 | Jung et al. |
| 2005/0128124 A1 | 6/2005 | Greneker et al. |
| 2005/0148876 A1 | 7/2005 | Endoh et al. |
| 2005/0231419 A1 | 10/2005 | Mitchell |
| 2005/0267366 A1 | 12/2005 | Murashita et al. |
| 2006/0035554 A1 | 2/2006 | Glaser et al. |
| 2006/0040739 A1 | 2/2006 | Wells |
| 2006/0047386 A1 | 3/2006 | Kanevsky et al. |
| 2006/0061504 A1 | 3/2006 | Leach, Jr. et al. |
| 2006/0125803 A1 | 6/2006 | Westerman et al. |
| 2006/0136997 A1 | 6/2006 | Telek et al. |
| 2006/0139162 A1 | 6/2006 | Flynn |
| 2006/0139314 A1 | 6/2006 | Bell |
| 2006/0148351 A1 | 7/2006 | Tao et al. |
| 2006/0157734 A1 | 7/2006 | Onodero et al. |
| 2006/0166620 A1 | 7/2006 | Sorensen |
| 2006/0170584 A1 | 8/2006 | Romero et al. |
| 2006/0209021 A1 | 9/2006 | Yoo et al. |
| 2006/0258205 A1 | 11/2006 | Locher et al. |
| 2006/0284757 A1 | 12/2006 | Zemany |
| 2007/0024488 A1 | 2/2007 | Zemany et al. |
| 2007/0026695 A1 | 2/2007 | Lee et al. |
| 2007/0027369 A1 | 2/2007 | Pagnacco et al. |
| 2007/0118043 A1 | 5/2007 | Oliver et al. |
| 2007/0161921 A1 | 7/2007 | Rausch |
| 2007/0164896 A1 | 7/2007 | Suzuki et al. |
| 2007/0176821 A1 | 8/2007 | Flom et al. |
| 2007/0192647 A1 | 8/2007 | Glaser |
| 2007/0197115 A1 | 8/2007 | Eves et al. |
| 2007/0197878 A1 | 8/2007 | Shklarski |
| 2007/0210074 A1 | 9/2007 | Maurer et al. |
| 2007/0237423 A1 | 10/2007 | Tico et al. |
| 2008/0001735 A1 | 1/2008 | Tran |
| 2008/0002027 A1 | 1/2008 | Kondo et al. |
| 2008/0015422 A1 | 1/2008 | Wessel |
| 2008/0024438 A1 | 1/2008 | Collins et al. |
| 2008/0039731 A1 | 2/2008 | McCombie et al. |
| 2008/0059578 A1 | 3/2008 | Albertson et al. |
| 2008/0065291 A1 | 3/2008 | Breed |
| 2008/0134102 A1 | 6/2008 | Movold et al. |
| 2008/0136775 A1 | 6/2008 | Conant |
| 2008/0168396 A1 | 7/2008 | Matas et al. |
| 2008/0194204 A1 | 8/2008 | Duet et al. |
| 2008/0194975 A1 | 8/2008 | MacQuarrie et al. |
| 2008/0211766 A1 | 9/2008 | Westerman et al. |
| 2008/0233822 A1 | 9/2008 | Swallow et al. |
| 2008/0278450 A1 | 11/2008 | Lashina |
| 2008/0282665 A1 | 11/2008 | Speleers |
| 2008/0291158 A1 | 11/2008 | Park et al. |
| 2008/0303800 A1 | 12/2008 | Elwell |
| 2008/0316085 A1 | 12/2008 | Rofougaran et al. |
| 2008/0320419 A1 | 12/2008 | Matas et al. |
| 2009/0018408 A1 | 1/2009 | Ouchi et al. |
| 2009/0018428 A1 | 1/2009 | Dias et al. |
| 2009/0033585 A1 | 2/2009 | Lang |
| 2009/0053950 A1 | 2/2009 | Surve |
| 2009/0056300 A1 | 3/2009 | Chung et al. |
| 2009/0058820 A1 | 3/2009 | Hinckley |
| 2009/0113298 A1 | 4/2009 | Jung et al. |
| 2009/0115617 A1 | 5/2009 | Sano et al. |
| 2009/0118648 A1 | 5/2009 | Kandori et al. |
| 2009/0149036 A1 | 6/2009 | Lee et al. |
| 2009/0177068 A1 | 7/2009 | Stivoric et al. |
| 2009/0203244 A1 | 8/2009 | Toonder |
| 2009/0226043 A1 | 9/2009 | Angell et al. |
| 2009/0253585 A1 | 10/2009 | Diatchenko et al. |
| 2009/0270690 A1 | 10/2009 | Roos et al. |
| 2009/0278915 A1 | 11/2009 | Kramer et al. |
| 2009/0288762 A1 | 11/2009 | Wolfel |
| 2009/0295712 A1 | 12/2009 | Ritzau |
| 2009/0319181 A1 | 12/2009 | Khosravy et al. |
| 2010/0045513 A1 | 2/2010 | Pett et al. |
| 2010/0050133 A1 | 2/2010 | Nishihara et al. |
| 2010/0053151 A1 | 3/2010 | Marti et al. |
| 2010/0060570 A1 | 3/2010 | Underkoffler et al. |
| 2010/0065320 A1 | 3/2010 | Urano |
| 2010/0069730 A1 | 3/2010 | Bergstrom et al. |
| 2010/0071205 A1 | 3/2010 | Graumann et al. |
| 2010/0094141 A1 | 4/2010 | Puswella |
| 2010/0109938 A1 | 5/2010 | Oswald et al. |
| 2010/0152600 A1 | 6/2010 | Droitcour et al. |
| 2010/0179820 A1 | 7/2010 | Harrison et al. |
| 2010/0198067 A1 | 8/2010 | Mahfouz et al. |
| 2010/0201586 A1 | 8/2010 | Michalk |
| 2010/0204550 A1 | 8/2010 | Heneghan et al. |
| 2010/0205667 A1 | 8/2010 | Anderson et al. |
| 2010/0208035 A1 | 8/2010 | Pinault et al. |
| 2010/0225562 A1 | 9/2010 | Smith |
| 2010/0234094 A1 | 9/2010 | Gagner et al. |
| 2010/0241009 A1 | 9/2010 | Petkie |
| 2010/0002912 A1 | 10/2010 | Solinsky |
| 2010/0281438 A1 | 11/2010 | Latta et al. |
| 2010/0292549 A1 | 11/2010 | Schuler |
| 2010/0306713 A1 | 12/2010 | Geisner et al. |
| 2010/0313414 A1 | 12/2010 | Sheats |
| 2010/0324384 A1 | 12/2010 | Moon et al. |
| 2010/0325770 A1 | 12/2010 | Chung et al. |
| 2011/0003664 A1 | 1/2011 | Richard |
| 2011/0010014 A1 | 1/2011 | Oexman et al. |
| 2011/0018795 A1 | 1/2011 | Jang |
| 2011/0029038 A1 | 2/2011 | Hyde et al. |
| 2011/0073353 A1 | 3/2011 | Lee et al. |
| 2011/0083111 A1 | 4/2011 | Forutanpour et al. |
| 2011/0093820 A1 | 4/2011 | Zhang et al. |
| 2011/0118564 A1 | 5/2011 | Sankai |
| 2011/0119640 A1 | 5/2011 | Berkes et al. |
| 2011/0166940 A1 | 7/2011 | Bangera et al. |
| 2011/0181509 A1 | 7/2011 | Rautiainen et al. |
| 2011/0181510 A1 | 7/2011 | Hakala et al. |
| 2011/0193939 A1 | 8/2011 | Vassigh et al. |
| 2011/0197263 A1 | 8/2011 | Stinson, III |
| 2011/0202404 A1 | 8/2011 | van der Riet |
| 2011/0213218 A1 | 9/2011 | Weiner et al. |
| 2011/0221666 A1 | 9/2011 | Newton et al. |
| 2011/0234492 A1 | 9/2011 | Ajmera et al. |
| 2011/0239118 A1 | 9/2011 | Yamaoka et al. |
| 2011/0245688 A1 | 10/2011 | Arora et al. |
| 2011/0279303 A1 | 11/2011 | Smith et al. |
| 2011/0286585 A1 | 11/2011 | Hodge |
| 2011/0303341 A1 | 12/2011 | Meiss et al. |
| 2011/0307842 A1 | 12/2011 | Chiang et al. |
| 2011/0316888 A1 | 12/2011 | Sachs et al. |
| 2011/0318985 A1 | 12/2011 | McDermid |
| 2012/0001875 A1 | 1/2012 | Li et al. |
| 2012/0019168 A1 | 1/2012 | Noda et al. |
| 2012/0029369 A1 | 2/2012 | Icove et al. |
| 2012/0047468 A1 | 2/2012 | Santos et al. |
| 2012/0068876 A1 | 3/2012 | Bangera et al. |
| 2012/0092284 A1 | 4/2012 | Rofougaran et al. |
| 2012/0123232 A1 | 5/2012 | Najarian et al. |
| 2012/0127082 A1 | 5/2012 | Kushler et al. |
| 2012/0144934 A1 | 6/2012 | Russell et al. |
| 2012/0150493 A1 | 6/2012 | Casey et al. |

(56) References Cited

U.S. PATENT DOCUMENTS

| | | |
|---|---|---|
| 2012/0154313 A1 | 6/2012 | Au et al. |
| 2012/0156926 A1 | 6/2012 | Kato et al. |
| 2012/0174299 A1 | 7/2012 | Balzano |
| 2012/0174736 A1 | 7/2012 | Wang et al. |
| 2012/0182222 A1 | 7/2012 | Moloney |
| 2012/0193801 A1 | 8/2012 | Gross et al. |
| 2012/0220835 A1 | 8/2012 | Chung |
| 2012/0248093 A1 | 10/2012 | Ulrich et al. |
| 2012/0254810 A1 | 10/2012 | Heck et al. |
| 2012/0268416 A1 | 10/2012 | Pirogov et al. |
| 2012/0280900 A1 | 11/2012 | Wang et al. |
| 2012/0298748 A1 | 11/2012 | Factor et al. |
| 2012/0310665 A1 | 12/2012 | Xu et al. |
| 2013/0016070 A1 | 1/2013 | Starner et al. |
| 2013/0027218 A1 | 1/2013 | Schwarz et al. |
| 2013/0035563 A1 | 2/2013 | Angelides |
| 2013/0046544 A1 | 2/2013 | Kay et al. |
| 2013/0053653 A1 | 2/2013 | Cuddihy et al. |
| 2013/0078624 A1 | 3/2013 | Holmes et al. |
| 2013/0082922 A1 | 4/2013 | Miller |
| 2013/0083173 A1 | 4/2013 | Geisner et al. |
| 2013/0086533 A1 | 4/2013 | Stienstra |
| 2013/0096439 A1 | 4/2013 | Lee et al. |
| 2013/0102217 A1 | 4/2013 | Jeon |
| 2013/0104084 A1 | 4/2013 | Mlyniec et al. |
| 2013/0113647 A1 | 5/2013 | Sentelle et al. |
| 2013/0113830 A1 | 5/2013 | Suzuki |
| 2013/0117377 A1 | 5/2013 | Miller |
| 2013/0132931 A1 | 5/2013 | Bruns et al. |
| 2013/0147833 A1 | 6/2013 | Aubauer et al. |
| 2013/0150735 A1 | 6/2013 | Cheng |
| 2013/0161078 A1 | 6/2013 | Li |
| 2013/0169471 A1 | 7/2013 | Lynch |
| 2013/0176161 A1 | 7/2013 | Derham et al. |
| 2013/0194173 A1 | 8/2013 | Zhu et al. |
| 2013/0195330 A1 | 8/2013 | Kim et al. |
| 2013/0196716 A1 | 8/2013 | Muhammad |
| 2013/0207962 A1 | 8/2013 | Oberdorfer et al. |
| 2013/0229508 A1 | 9/2013 | Li et al. |
| 2013/0241765 A1 | 9/2013 | Kozma et al. |
| 2013/0245986 A1 | 9/2013 | Grokop et al. |
| 2013/0253029 A1 | 9/2013 | Jain et al. |
| 2013/0260630 A1 | 10/2013 | Ito et al. |
| 2013/0278499 A1 | 10/2013 | Anderson |
| 2013/0278501 A1 | 10/2013 | Bulzacki |
| 2013/0281024 A1 | 10/2013 | Rofougaran et al. |
| 2013/0283203 A1 | 10/2013 | Batraski et al. |
| 2013/0322729 A1 | 12/2013 | Mestha et al. |
| 2013/0332438 A1 | 12/2013 | Li et al. |
| 2013/0345569 A1 | 12/2013 | Mestha et al. |
| 2014/0005809 A1 | 1/2014 | Frei et al. |
| 2014/0022108 A1 | 1/2014 | Alberth et al. |
| 2014/0028539 A1 | 1/2014 | Newham et al. |
| 2014/0049487 A1 | 2/2014 | Konertz et al. |
| 2014/0050354 A1 | 2/2014 | Heim et al. |
| 2014/0051941 A1 | 2/2014 | Messerschmidt |
| 2014/0070957 A1 | 3/2014 | Longinotti-Buitoni et al. |
| 2014/0072190 A1 | 3/2014 | Wu et al. |
| 2014/0073486 A1 | 3/2014 | Ahmed et al. |
| 2014/0073969 A1 | 3/2014 | Zou et al. |
| 2014/0081100 A1 | 3/2014 | Muhsin et al. |
| 2014/0095480 A1 | 4/2014 | Marantz et al. |
| 2014/0097979 A1 | 4/2014 | Nohara et al. |
| 2014/0121540 A1 | 5/2014 | Raskin |
| 2014/0135631 A1 | 5/2014 | Brumback et al. |
| 2014/0139422 A1 | 5/2014 | Mistry et al. |
| 2014/0139616 A1 | 5/2014 | Pinter et al. |
| 2014/0143678 A1 | 5/2014 | Mistry et al. |
| 2014/0149859 A1 | 5/2014 | Van Dyken et al. |
| 2014/0184496 A1 | 7/2014 | Gribetz et al. |
| 2014/0184499 A1 | 7/2014 | Kim |
| 2014/0191939 A1 | 7/2014 | Penn et al. |
| 2014/0200416 A1 | 7/2014 | Kashef et al. |
| 2014/0201690 A1 | 7/2014 | Holz |
| 2014/0208275 A1 | 7/2014 | Mongia et al. |
| 2014/0215389 A1 | 7/2014 | Ivalsh et al. |
| 2014/0239065 A1 | 8/2014 | Zhou et al. |
| 2014/0244277 A1 | 8/2014 | Krishna Rao et al. |
| 2014/0246415 A1 | 9/2014 | Wittkowski |
| 2014/0247212 A1 | 9/2014 | Kim et al. |
| 2014/0250515 A1 | 9/2014 | Jakobsson |
| 2014/0253431 A1 | 9/2014 | Gossweiler et al. |
| 2014/0253709 A1 | 9/2014 | Bresch et al. |
| 2014/0262478 A1 | 9/2014 | Harris et al. |
| 2014/0275854 A1 | 9/2014 | Venkatraman et al. |
| 2014/0280295 A1 | 9/2014 | Kurochikin et al. |
| 2014/0281975 A1 | 9/2014 | Anderson et al. |
| 2014/0282877 A1 | 9/2014 | Mahaffey et al. |
| 2014/0297006 A1 | 10/2014 | Sadhu |
| 2014/0298266 A1 | 10/2014 | Lapp |
| 2014/0300506 A1 | 10/2014 | Alton et al. |
| 2014/0306936 A1 | 10/2014 | Dahl et al. |
| 2014/0309855 A1 | 10/2014 | Tran |
| 2014/0316261 A1 | 10/2014 | Lux et al. |
| 2014/0318699 A1 | 10/2014 | Longinotti-Buitoni et al. |
| 2014/0324888 A1 | 10/2014 | Xie et al. |
| 2014/0329567 A1 | 11/2014 | Chan et al. |
| 2014/0333467 A1 | 11/2014 | Inomata |
| 2014/0343392 A1 | 11/2014 | Yang |
| 2014/0347295 A1 | 11/2014 | Kim et al. |
| 2014/0357369 A1 | 12/2014 | Callens et al. |
| 2014/0368378 A1 | 12/2014 | Crain et al. |
| 2014/0368441 A1 | 12/2014 | Touloumtzis |
| 2014/0376788 A1 | 12/2014 | Xu et al. |
| 2015/0002391 A1 | 1/2015 | Chen |
| 2015/0009096 A1 | 1/2015 | Lee et al. |
| 2015/0026815 A1 | 1/2015 | Barrett |
| 2015/0029050 A1 | 1/2015 | Driscoll et al. |
| 2015/0030256 A1 | 1/2015 | Brady et al. |
| 2015/0040040 A1 | 2/2015 | Balan et al. |
| 2015/0046183 A1 | 2/2015 | Cireddu |
| 2015/0062033 A1 | 3/2015 | Ishihara |
| 2015/0068069 A1 | 3/2015 | Tran et al. |
| 2015/0077282 A1 | 3/2015 | Mohamadi |
| 2015/0085060 A1 | 3/2015 | Fish et al. |
| 2015/0091820 A1 | 4/2015 | Rosenberg et al. |
| 2015/0091858 A1 | 4/2015 | Rosenberg et al. |
| 2015/0091859 A1 | 4/2015 | Rosenberg et al. |
| 2015/0091903 A1 | 4/2015 | Costello et al. |
| 2015/0095987 A1 | 4/2015 | Potash et al. |
| 2015/0099941 A1 | 4/2015 | Tran |
| 2015/0100328 A1 | 4/2015 | Kress et al. |
| 2015/0106770 A1 | 4/2015 | Shah et al. |
| 2015/0109164 A1 | 4/2015 | Takaki |
| 2015/0112606 A1 | 4/2015 | He et al. |
| 2015/0133017 A1 | 5/2015 | Liao et al. |
| 2015/0143601 A1 | 5/2015 | Longinotti-Buitoni et al. |
| 2015/0145805 A1 | 5/2015 | Liu |
| 2015/0162729 A1 | 6/2015 | Reversat et al. |
| 2015/0177866 A1 | 6/2015 | Hwang et al. |
| 2015/0185314 A1 | 7/2015 | Corcos et al. |
| 2015/0199045 A1 | 7/2015 | Robucci et al. |
| 2015/0205358 A1 | 7/2015 | Lyren |
| 2015/0223733 A1 | 8/2015 | Al-Alusi |
| 2015/0226004 A1 | 8/2015 | Thompson |
| 2015/0229885 A1* | 8/2015 | Offenhaeuser ........ B60W 30/09 348/78 |
| 2015/0256763 A1 | 9/2015 | Niemi |
| 2015/0261320 A1 | 9/2015 | Leto |
| 2015/0268027 A1 | 9/2015 | Gerdes |
| 2015/0268799 A1 | 9/2015 | Starner et al. |
| 2015/0277569 A1 | 10/2015 | Sprenger et al. |
| 2015/0280102 A1 | 10/2015 | Tajitsu et al. |
| 2015/0285906 A1 | 10/2015 | Hooper et al. |
| 2015/0287187 A1 | 10/2015 | Redtel |
| 2015/0301167 A1 | 10/2015 | Sentelle et al. |
| 2015/0312041 A1 | 10/2015 | Choi |
| 2015/0314780 A1* | 11/2015 | Stenneth ............... B60W 30/00 701/23 |
| 2015/0317518 A1 | 11/2015 | Fujimaki et al. |
| 2015/0323993 A1 | 11/2015 | Levesque et al. |
| 2015/0332075 A1 | 11/2015 | Burch |
| 2015/0341550 A1 | 11/2015 | Lay |
| 2015/0346820 A1 | 12/2015 | Poupyrev et al. |

(56) References Cited

U.S. PATENT DOCUMENTS

| | | |
|---|---|---|
| 2015/0350902 A1 | 12/2015 | Baxley et al. |
| 2015/0351703 A1 | 12/2015 | Phillips et al. |
| 2015/0375339 A1 | 12/2015 | Sterling et al. |
| 2016/0018948 A1 | 1/2016 | Parvarandeh et al. |
| 2016/0026253 A1 | 1/2016 | Bradski et al. |
| 2016/0038083 A1 | 2/2016 | Ding et al. |
| 2016/0041617 A1 | 2/2016 | Poupyrev |
| 2016/0041618 A1 | 2/2016 | Poupyrev |
| 2016/0042169 A1 | 2/2016 | Polehn |
| 2016/0048235 A1 | 2/2016 | Poupyrev |
| 2016/0048236 A1 | 2/2016 | Poupyrev |
| 2016/0048672 A1 | 2/2016 | Lux et al. |
| 2016/0054792 A1 | 2/2016 | Poupyrev |
| 2016/0054803 A1 | 2/2016 | Poupyrev |
| 2016/0054804 A1 | 2/2016 | Gollakata et al. |
| 2016/0055201 A1 | 2/2016 | Poupyrev et al. |
| 2016/0090839 A1 | 3/2016 | Stolarcyzk |
| 2016/0098089 A1 | 4/2016 | Poupyrev |
| 2016/0100166 A1 | 4/2016 | Dragne et al. |
| 2016/0103500 A1 | 4/2016 | Hussey et al. |
| 2016/0106328 A1 | 4/2016 | Mestha et al. |
| 2016/0131741 A1 | 5/2016 | Park |
| 2016/0140872 A1 | 5/2016 | Palmer et al. |
| 2016/0145776 A1 | 5/2016 | Roh |
| 2016/0146931 A1 | 5/2016 | Rao et al. |
| 2016/0170491 A1 | 6/2016 | Jung |
| 2016/0171293 A1 | 6/2016 | Li et al. |
| 2016/0186366 A1 | 6/2016 | McMaster |
| 2016/0206244 A1 | 7/2016 | Rogers |
| 2016/0213331 A1 | 7/2016 | Gil et al. |
| 2016/0216825 A1 | 7/2016 | Forutanpour |
| 2016/0220152 A1 | 8/2016 | Meriheina et al. |
| 2016/0249698 A1 | 9/2016 | Berzowska et al. |
| 2016/0252607 A1 | 9/2016 | Saboo et al. |
| 2016/0252965 A1 | 9/2016 | Mandella et al. |
| 2016/0253044 A1 | 9/2016 | Katz |
| 2016/0259037 A1 | 9/2016 | Molchanov et al. |
| 2016/0262685 A1 | 9/2016 | Wagner et al. |
| 2016/0282988 A1 | 9/2016 | Poupyrev |
| 2016/0283101 A1 | 9/2016 | Schwesig et al. |
| 2016/0284436 A1 | 9/2016 | Fukuhara et al. |
| 2016/0287172 A1 | 10/2016 | Morris et al. |
| 2016/0299526 A1 | 10/2016 | Inagaki et al. |
| 2016/0320852 A1 | 11/2016 | Poupyrev |
| 2016/0320853 A1 | 11/2016 | Lien et al. |
| 2016/0320854 A1 | 11/2016 | Lien et al. |
| 2016/0321428 A1 | 11/2016 | Rogers |
| 2016/0338599 A1 | 11/2016 | DeBusschere et al. |
| 2016/0345638 A1 | 12/2016 | Robinson et al. |
| 2016/0349790 A1 | 12/2016 | Connor |
| 2016/0349845 A1 | 12/2016 | Poupyrev et al. |
| 2016/0377712 A1 | 12/2016 | Wu et al. |
| 2017/0029985 A1 | 2/2017 | Tajitsu et al. |
| 2017/0052618 A1 | 2/2017 | Lee |
| 2017/0060254 A1 | 3/2017 | Molchanov et al. |
| 2017/0060298 A1 | 3/2017 | Hwang et al. |
| 2017/0075481 A1 | 3/2017 | Chou et al. |
| 2017/0075496 A1 | 3/2017 | Rosenberg et al. |
| 2017/0097413 A1 | 4/2017 | Gillian et al. |
| 2017/0097684 A1 | 4/2017 | Lien |
| 2017/0115777 A1 | 4/2017 | Poupyrev |
| 2017/0124407 A1* | 5/2017 | Micks ............... G06T 7/20 |
| 2017/0125940 A1 | 5/2017 | Karagozler et al. |
| 2017/0192523 A1 | 7/2017 | Poupyrev |
| 2017/0192629 A1 | 7/2017 | Takada et al. |
| 2017/0196513 A1 | 7/2017 | Longinotti-Buitoni et al. |
| 2017/0232538 A1 | 8/2017 | Robinson et al. |
| 2017/0233903 A1 | 8/2017 | Jeon |
| 2017/0249033 A1 | 8/2017 | Podhajny et al. |
| 2017/0322633 A1 | 11/2017 | Shen et al. |
| 2017/0325337 A1 | 11/2017 | Karagozler et al. |
| 2017/0325518 A1 | 11/2017 | Poupyrev et al. |
| 2017/0329412 A1 | 11/2017 | Schwesig et al. |
| 2017/0329425 A1 | 11/2017 | Karagozler et al. |
| 2018/0000354 A1 | 1/2018 | DeBusschere et al. |
| 2018/0000355 A1 | 1/2018 | DeBusschere et al. |
| 2018/0004301 A1 | 1/2018 | Poupyrev |
| 2018/0005766 A1 | 1/2018 | Fairbanks et al. |
| 2018/0046258 A1 | 2/2018 | Poupyrev |
| 2018/0095541 A1 | 4/2018 | Gribetz et al. |
| 2018/0106897 A1 | 4/2018 | Shouldice et al. |
| 2018/0113032 A1 | 4/2018 | Dickey et al. |
| 2018/0157330 A1 | 6/2018 | Gu et al. |
| 2018/0160943 A1 | 6/2018 | Fyfe et al. |
| 2018/0177464 A1 | 6/2018 | DeBusschere et al. |
| 2018/0196527 A1 | 7/2018 | Poupyrev et al. |
| 2018/0256106 A1 | 9/2018 | Rogers et al. |
| 2018/0296163 A1 | 10/2018 | DeBusschere et al. |
| 2018/0321841 A1 | 11/2018 | Lapp |
| 2019/0033981 A1 | 1/2019 | Poupyrev |
| 2019/0138109 A1 | 5/2019 | Poupyrev et al. |
| 2019/0155396 A1 | 5/2019 | Lien et al. |
| 2019/0208837 A1 | 7/2019 | Poupyrev et al. |
| 2019/0232156 A1 | 8/2019 | Amihood et al. |
| 2019/0243464 A1 | 8/2019 | Lien et al. |
| 2019/0257939 A1 | 8/2019 | Schwesig et al. |

FOREIGN PATENT DOCUMENTS

| | | |
|---|---|---|
| CN | 102414641 | 4/2012 |
| CN | 102782612 | 11/2012 |
| CN | 102893327 | 1/2013 |
| CN | 202887794 | 4/2013 |
| CN | 103076911 | 5/2013 |
| CN | 103502911 | 1/2014 |
| CN | 102660988 | 3/2014 |
| CN | 104035552 | 9/2014 |
| CN | 103355860 | 1/2016 |
| DE | 102011075725 | 11/2012 |
| DE | 102013201359 | 7/2014 |
| EP | 0161895 | 11/1985 |
| EP | 1785744 | 5/2007 |
| EP | 1815788 | 8/2007 |
| EP | 2417908 | 2/2012 |
| EP | 2637081 | 9/2013 |
| EP | 2770408 | 8/2014 |
| EP | 2953007 | 12/2015 |
| EP | 3201726 | 8/2017 |
| FR | 3017722 | 8/2015 |
| GB | 2070469 | 9/1981 |
| GB | 2443208 | 4/2008 |
| JP | 113860 | 4/1999 |
| JP | 11168268 | 6/1999 |
| JP | 2003280049 | 10/2003 |
| JP | 2006234716 | 9/2006 |
| JP | 2007011873 | 1/2007 |
| JP | 2007132768 | 5/2007 |
| JP | 2008287714 | 11/2008 |
| JP | 2009037434 | 2/2009 |
| JP | 2011102457 | 5/2011 |
| JP | 201218583 | 9/2012 |
| JP | 2012198916 | 10/2012 |
| JP | 2013196047 | 9/2013 |
| JP | 2014532332 | 12/2014 |
| KR | 1020080102516 | 11/2008 |
| KR | 100987650 | 10/2010 |
| KR | 1020140055985 | 5/2014 |
| KR | 101914850 | 10/2018 |
| TW | 201425974 | 7/2014 |
| WO | 9001895 | 3/1990 |
| WO | WO-0130123 | 4/2001 |
| WO | WO-2001027855 | 4/2001 |
| WO | WO-0175778 | 10/2001 |
| WO | WO-2002082999 | 10/2002 |
| WO | 2004004557 | 1/2004 |
| WO | WO-2005033387 | 4/2005 |
| WO | 2007125298 | 11/2007 |
| WO | WO-2008061385 | 5/2008 |
| WO | WO-2009032073 | 3/2009 |
| WO | 2009083467 | 7/2009 |
| WO | WO-2010032173 | 3/2010 |
| WO | 2010101697 | 9/2010 |
| WO | WO-2012026013 | 3/2012 |
| WO | 2012064847 | 5/2012 |

(56) References Cited

FOREIGN PATENT DOCUMENTS

| WO | WO-2012152476 | 11/2012 |
|---|---|---|
| WO | WO-2013082806 | 6/2013 |
| WO | WO-2013084108 | 6/2013 |
| WO | 2013192166 | 12/2013 |
| WO | WO-2013186696 | 12/2013 |
| WO | WO-2013191657 | 12/2013 |
| WO | WO-2014019085 | 2/2014 |
| WO | 2014085369 | 6/2014 |
| WO | WO-2014116968 | 7/2014 |
| WO | 2014124520 | 8/2014 |
| WO | WO-2014136027 | 9/2014 |
| WO | WO-2014138280 | 9/2014 |
| WO | WO-2014160893 | 10/2014 |
| WO | WO-2014165476 | 10/2014 |
| WO | WO-2014204323 | 12/2014 |
| WO | WO-2015017931 | 2/2015 |
| WO | WO-2015022671 | 2/2015 |
| WO | 2016053624 | 4/2016 |
| WO | 2016118534 | 7/2016 |
| WO | 2016176471 | 11/2016 |
| WO | 2016178797 | 11/2016 |
| WO | 2017019299 | 2/2017 |
| WO | 2017062566 | 4/2017 |
| WO | 2017200571 | 11/2017 |
| WO | 20170200949 | 11/2017 |
| WO | 2018106306 | 6/2018 |

OTHER PUBLICATIONS

"Final Office Action", U.S. Appl. No. 14/504,139, dated May 1, 2018, 14 pages.
"Final Office Action", U.S. Appl. No. 15/595,649, dated May 23, 2018, 13 pages.
"Final Office Action", U.S. Appl. No. 15/142,689, dated Jun. 1, 2018, 16 pages.
"Final Office Action", U.S. Appl. No. 14/874,955, dated Jun. 11, 2018, 9 pages.
"Final Office Action", U.S. Appl. No. 14/959,901, dated Jun. 15, 2018, 21 pages.
"Final Office Action", U.S. Appl. No. 15/286,152, dated Jun. 26, 2018, 25 pages.
"Final Office Action", U.S. Appl. No. 15/267,181, dated Jun. 7, 2018, 31 pages.
"First Action Interview Office Action", U.S. Appl. No. 15/166,198, dated Apr. 25, 2018, 8 pages.
"Foreign Office Action", European Application No. 16784352.3, dated May 16, 2018, 3 pages.
"Foreign Office Action", Chinese Application No. 201721290290.3, dated Jun. 6, 2018, 3 pages.
"Non-Final Office Action", U.S. Appl. No. 15/287,253, dated Apr. 5, 2018, 17 pages.
"Non-Final Office Action", U.S. Appl. No. 15/586,174, dated Jun. 18, 2018, 7 pages.
"Notice of Allowance", U.S. Appl. No. 14/862,409, dated Jun. 6, 2018, 7 pages.
"Pre-Interview Communication", U.S. Appl. No. 15/362,359, dated May 17, 2018, 4 pages.
"Preliminary Report on Patentability", PCT Application No. PCT/US2016/055671, dated Apr. 10, 2018, 9 pages.
"Written Opinion", PCT Application No. PCT/US2017/032733, dated Jul. 24, 2017, 5 pages.
"Advisory Action", U.S. Appl. No. 14/504,139, dated Aug. 28, 2017, 3 pages.
"Final Office Action", U.S. Appl. No. 14/959,901, dated Aug. 25, 2017, 19 pages.
"Final Office Action", U.S. Appl. No. 15/403,066, dated Oct. 5, 2017, 31 pages.
"Non-Final Office Action", U.S. Appl. No. 15/093,533, dated Aug. 24, 2017, 18 pages.
"Non-Final Office Action", U.S. Appl. No. 15/142,619, dated Aug. 25, 2017, 16 pages.
Non-Final Office Action, U.S. Appl. No. 14/959,799, dated Sep. 8, 2017, 16 pages.
"Non-Final Office Action", U.S. Appl. No. 15/398,147, dated Sep. 8, 2017, 7 pages.
"Non-Final Office Action", U.S. Appl. No. 14/518,863, dated Sep. 29, 2017, 20 pages.
"Non-Final Office Action", U.S. Appl. No. 15/142,689, dated Oct. 4, 2017, 18 pages.
"Pre-Interview Office Action", U.S. Appl. No. 14/862,409, dated Sep. 15, 2017, 16 pages.
"Written Opinion", PCT Application No. PCT/US2016/055671, dated Apr. 13, 2017, 8 pages.
"Written Opinion", PCT Application No. PCT/US2017/032733, dated Jul. 26, 2017, 5 pages.
"Final Office Action", U.S. Appl. No. 14/504,061, dated Mar. 9, 2016, 10 pages.
"International Search Report and Written Opinion", Application No. PCT/US2015/044774, dated Nov. 3, 2015, 12 pages.
"Extended European Search Report", EP Application No. 15170577.9, dated Nov. 5, 2015, 12 pages.
"International Search Report and Written Opinion", Application No. PCT/US2016/024267, dated Jun. 20, 2016, 13 pages.
"International Search Report and Written Opinion", Application No. PCT/US2016/024273, dated Jun. 20, 2016, 13 pages.
"International Search Report and Written Opinion", Application No. PCT/US2016/032307, dated Aug. 25, 2016, 13 pages.
"International Search Report and Written Opinion", Application No. PCT/US2016/029820, dated Jul. 15, 2016, 14 pages.
"International Search Report and Written Opinion", Application No. PCT/US2016/030177, dated Aug. 2, 2016, 15 pages.
"Non-Final Office Action", U.S. Appl. No. 14/930,220, dated Sep. 14, 2016, 15 pages.
"International Search Report and Written Opinion", Application No. PCT/US2015/043963, dated Nov. 24, 2015, 16 pages.
"International Search Report and Written Opinion", Application No. PCT/US2015/050903, dated Feb. 19, 2016, 18 pages.
"International Search Report and Written Opinion", Application No. PCT/US2016/030115, dated Aug. 8, 2016, 18 pages.
"International Search Report and Written Opinion", Application No. PCT/US2015/043949, dated Dec. 1, 2015, 18 pages.
"Frogpad Introduces Wearable Fabric Keyboard with Bluetooth Technology", Retrieved From: <http://www.geekzone.co.nz/content.asp?contentid=3898> Mar. 16, 2015, Jan. 7, 2005, 2 pages.
"Philips Vital Signs Camera", Retrieved From: <http://www.vitalsignscamera.com/> Apr. 15, 2015, Jul. 17, 2013, 2 pages.
"Non-Final Office Action", U.S. Appl. No. 14/504,038, dated Feb. 26, 2016, 22 pages.
"Final Office Action", U.S. Appl. No. 14/504,038, dated Sep. 27, 2016, 23 pages.
"Non-Final Office Action", U.S. Appl. No. 14/312,486, dated Oct. 23, 2015, 25 pages.
"Final Office Action", U.S. Appl. No. 14/312,486, dated Jun. 3, 2016, 32 pages.
"Restriction Requirement", U.S. Appl. No. 14/666,155, dated Jul. 22, 2016, 5 pages.
"The Instant Blood Pressure app estimates blood pressure with your smartphone and our algorithm", Retrieved at: http://www.instantbloodpressure.com/—on Jun. 23, 2016, 6 pages.
"Cardiio", Retrieved From: <http://www.cardiio.com/> Apr. 15, 2015 App Information Retrieved From: <https://itunes.apple.com/us/app/cardiio-touchless-camera-pulse/id542891434?ls=1&mt=8> Apr. 15, 2015, Feb. 24, 2015, 6 pages.
"Notice of Allowance", U.S. Appl. No. 14/504,061, dated Sep. 12, 2016, 7 pages.
"Non-Final Office Action", U.S. Appl. No. 14/504,061, dated Nov. 4, 2015, 8 pages.
"Non-Final Office Action", U.S. Appl. No. 14/582,896, dated Jun. 29, 2016, 9 pages.
"Non-Final Office Action", U.S. Appl. No. 14/681,625, dated Aug. 12, 2016, 9 pages.

(56) References Cited

OTHER PUBLICATIONS

"Non-Final Office Action", U.S. Appl. No. 14/666,155, dated Aug. 24, 2016, 9 pages.
Arbabian,"A 94GHz mm-Wave to Baseband Pulsed-Radar for Imaging and Gesture Recognition", 2012 IEEE, 2012 Symposium on VLSI Circuits Digest of Technical Papers, 2012, 2 pages.
Balakrishnan,"Detecting Pulse from Head Motions in Video", In Proceedings: CVPR '13 Proceedings of the 2013 IEEE Conference on Computer Vision and Pattern Recognition Available at: <http://people.csail.mitedu/mrub/vidmag/papers/Balakrishnan_Detecting_Pulse_from_2013_CVPR_paper.pdf>, Jun. 23, 2013, 8 pages.
Couderc,"Detection of Atrial Fibrillation using Contactless Facial Video Monitoring", In Proceedings: Heart Rhythm Society, vol. 12, Issue 1 Available at: <http://www.heartrhythmjournal.com/article/S1547-5271(14)00924-2/pdf>, Jan. 2015, 7 pages.
Espina,"Wireless Body Sensor Network for Continuous Cuff-less Blood Pressure Monitoring", International Summer School on Medical Devices and Biosensors, 2006, Sep. 2006, 5 pages.
Godana,"Human Movement Characterization in Indoor Environment using GNU Radio Based Radar", Retrieved at: http://repository.tudelft.nl/islandora/object/uuid:414e1868-dd00-4113-9989-4c213f1f7094?collection=education, Nov. 30, 2009, 100 pages.
He,"A Continuous, Wearable, and Wireless Heart Monitor Using Head Ballistocardiogram (BCG) and Head Electrocardiogram (EEC) with a Nanowatt ECG Heartbeat Detection Circuit", In Proceedings: Thesis, Department of Electrical Engineering and Computer Science, Massachusetts Institute of Technology Available at: <http://dspace.mit.edu/handle/1721.1/79221>, Feb. 2013, 137 pages.
Holleis,"Evaluating Capacitive Touch Input on Clothes", Proceedings of the 10th International Conference on Human Computer Interaction, Jan. 1, 2008, 10 pages.
Nakajima,"Development of Real-Time Image Sequence Analysis for Evaluating Posture Change and Respiratory Rate of a Subject in Bed", In Proceedings: Physiological Measurement, vol. 22, No. 3 Retrieved From: <http://iopscience.iop.org/0967-3334/22/3/401/pdf/0967-3334_22_3_401.pdf> Feb. 27, 2015, Aug. 2001, 8 pages.
Patel,"Applications of Electrically Conductive Yarns in Technical Textiles", International Conference on Power System Technology (POWECON), Oct. 30, 2012, 6 pages.
Poh,"A Medical Mirror for Non-contact Health Monitoring", In Proceedings: ACM SIGGRPH Emerging Technologies Available at: <http://affect.media.mit.edu/pdfs/11.Poh-etal-SIGGRAPH.pdf>, 2011, 1 page.
Poh,"Non-contact, Automated Cardiac Pulse Measurements Using Video Imaging and Blind Source Separation.", In Proceedings: Optics Express, vol. 18, No. 10 Available at: <http://www.opticsinfobase.org/view_article.cfm?gotourl=http%3A%2F%2Fwww%2Eopticsinfobase%2Eorg%2FDirectPDFAccess%2F77B04D55%2DBC95%2D6937%2D5BAC49A426378C02%5F199381%2Foe%2D18%2D10%2D10762%2EP, May 7, 2010, 13 pages.
Pu,"Whole-Home Gesture Recognition Using Wireless Signals", MobiCom '13 Proceedings of the 19th annual international conference on Mobile computing & networking, Aug. 27, 2013, 12 pages.
Wang,"Exploiting Spatial Redundancy of Image Sensor for Motion Robust rPPG", In Proceedings: IEEE Transactions on Biomedical Engineering, vol. 62, Issue 2, Jan. 19, 2015, 11 pages.
Wang,"Micro-Doppler Signatures for Intelligent Human Gait Recognition Using a UWB Impulse Radar", 2011 IEEE International Symposium on Antennas and Propagation (APSURSI), Jul. 3, 2011, pp. 2103-2106.
Wijesiriwardana,"Capacitive Fibre-Meshed Transducer for Touch & Proximity Sensing Applications", IEEE Sensors Journal, IEEE Service Center, Oct. 1, 2005, 5 pages.
Zhadobov,"Millimeter-wave Interactions with the Human Body: State of Knowledge and Recent Advances", International Journal of Microwave and Wireless Technologies, Mar. 1, 2011, 11 pages.
Zhang,"Study of the Structural Design and Capacitance Characteristics of Fabric Sensor", Advanced Materials Research (vols. 194-196), Feb. 21, 2011, 8 pages.

"Combined Search and Examination Report", GB Application No. 1620892.8, dated Apr. 6, 2017, 5 pages.
"Corrected Notice of Allowance", U.S. Appl. No. 14/930,220, dated Mar. 20, 2017, 2 pages.
"Corrected Notice of Allowance", U.S. Appl. No. 14/930,220, dated May 11, 2017, 2 pages.
"Final Office Action", U.S. Appl. No. 14/518,863, dated May 5, 2017, 18 pages.
"First Action Interview Office Action", U.S. Appl. No. 14/959,901, dated Apr. 14, 2017, 3 pages.
"International Preliminary Report on Patentability", Application No. PCT/US2015/050903, dated Apr. 13, 2017, 12 pages.
"International Search Report and Written Opinion", Application No. PCT/US2016/060399, dated Jan. 30, 2017, 11 pages.
"Non-Final Office Action", U.S. Appl. No. 14/504,038, dated Mar. 22, 2017, 33 pages.
"Non-Final Office Action", U.S. Appl. No. 15/398,147, dated Mar. 9, 2017, 10 pages.
"Non-Final Office Action", U.S. Appl. No. 15/403,066, dated May 4, 2017, 31 pages.
"Notice of Allowance", U.S. Appl. No. 14/494,863, dated May 30, 2017, 7 pages.
"Pre-Interview Communication", U.S. Appl. No. 15/343,067, dated Apr. 19, 2017, 3 pages.
"Textile Wire Brochure", Retrieved at: http://www.textile-wire.ch/en/home.html, Aug. 7, 2004, 17 pages.
Stoppa,"Wearable Electronics and Smart Textiles: A Critical Review", In Proceedings of Sensors, vol. 14, Issue 7, Jul. 7, 2014, pp. 11957-11992.
"Combined Search and Examination Report", GB Application No. 1620891.0, dated May 31, 2017, 9 pages.
"Final Office Action", U.S. Appl. No. 15/398,147, dated Jun. 30, 2017, 11 pages.
"Final Office Action", U.S. Appl. No. 14/874,955, dated Jun. 30, 2017, 9 pages.
"Final Office Action", U.S. Appl. No. 14/959,799, dated Jul. 19, 2017, 12 pages.
"Final Office Action", U.S. Appl. No. 14/504,121, dated Aug. 8, 2017, 16 pages.
"International Search Report and Written Opinion", Application No. PCT/US2016/063874, dated May 11, 2017, 19 pages.
"Non-Final Office Action", U.S. Appl. No. 14/862,409, dated Jun. 22, 2017, 15 pages.
"Non-Final Office Action", U.S. Appl. No. 14/959,730, dated Jun. 23, 2017, 14 pages.
"Notice of Allowance", U.S. Appl. No. 14/513,875, dated Jun. 28, 2017, 7 pages.
"Notice of Allowance", U.S. Appl. No. 15/343,067, dated Jul. 27, 2017, 9 pages.
"Notice of Allowance", U.S. Appl. No. 14/504,038, dated Aug. 7, 2017, 17 pages.
"Final Office Action", U.S. Appl. No. 15/142,619, dated Feb. 8, 2018, 15 pages.
"Final Office Action", U.S. Appl. No. 15/093,533, dated Mar. 21, 2018, 19 pages.
"First Action Interview Office Action", U.S. Appl. No. 15/286,152, dated Mar. 1, 2018, 5 pages.
"Foreign Office Action", Chinese Application No. 201721290290.3, dated Mar. 9, 2018, 2 pages.
"Non-Final Office Action", U.S. Appl. No. 15/267,181, dated Feb. 8, 2018, 29 pages.
"Non-Final Office Action", U.S. Appl. No. 14/874,955, dated Feb. 8, 2018, 7 pages.
"Notice of Allowance", U.S. Appl. No. 14/959,730, dated Feb. 22, 2018, 8 pages.
"Pre-Interview Communication", U.S. Appl. No. 15/166,198, dated Mar. 8, 2018, 8 pages.
"Pre-Interview First Office Action", U.S. Appl. No. 15/286,152, dated Feb. 8, 2018, 4 pages.
"Corrected Notice of Allowance", U.S. Appl. No. 14/504,061, dated Dec. 27, 2016, 2 pages.
"Corrected Notice of Allowance", U.S. Appl. No. 14/582,896, dated Dec. 19, 2016, 2 pages.

(56) References Cited

OTHER PUBLICATIONS

"International Search Report and Written Opinion", Application No. PCT/US2016/024289, dated Aug. 25, 2016, 17 pages.
Cheng,"Smart Textiles: From Niche to Mainstream", IEEE Pervasive Computing, Jul. 2013, pp. 81-84.
Farringdon,"Wearable Sensor Badge & Sensor Jacket for Context Awareness", Third International Symposium on Wearable Computers, Oct. 1999, 7 pages.
Schneegass,"Towards a Garment OS: Supporting Application Development for Smart Garments", Wearable Computers, ACM, Sep. 2014, 6 pages.
"Corrected Notice of Allowance", U.S. Appl. No. 14/312,486, dated Jan. 23, 2017, 4 pages.
"Corrected Notice of Allowance", U.S. Appl. No. 14/582,896, dated Feb. 6, 2017, 2 pages.
"Corrected Notice of Allowance", U.S. Appl. No. 14/582,896, dated Feb. 23, 2017, 2 pages.
"International Preliminary Report on Patentability", Application No. PCT/US2015/043963, dated Feb. 16, 2017, 12 pages.
"International Preliminary Report on Patentability", Application No. PCT/US2015/030388, dated Dec. 15, 2016, 12 pages.
"International Preliminary Report on Patentability", Application No. PCT/US2015/043949, dated Feb. 16, 2017, 13 pages.
"International Preliminary Report on Patentability", Application No. PCT/US2015/044774, dated Mar. 2, 2017, 8 pages.
"International Search Report and Written Opinion", Application No. PCT/US2016/062082, dated Feb. 23, 2017, 12 pages.
"International Search Report and Written Opinion", Application No. PCT/US2016/055671, dated Dec. 1, 2016, 14 pages.
"Non-Final Office Action", U.S. Appl. No. 14/504,121, dated Jan. 9, 2017, 13 pages.
"Non-Final Office Action", U.S. Appl. No. 14/504,139, dated Jan. 27, 2017, 10 pages.
"Non-Final Office Action", U.S. Appl. No. 14/513,875, dated Feb. 21, 2017, 9 pages.
"Non-Final Office Action", U.S. Appl. No. 14/874,955, dated Feb. 27, 2017, 8 pages.
"Non-Final Office Action", U.S. Appl. No. 14/959,799, dated Jan. 27, 2017, 10 pages.
"Notice of Allowance", U.S. Appl. No. 14/930,220, dated Feb. 2, 2017, 8 pages.
"Pre-Interview Communication", U.S. Appl. No. 14/494,863, dated Jan. 27, 2017, 5 pages.
"Pre-Interview Communication", U.S. Appl. No. 14/959,730, dated Feb. 15, 2017, 3 pages.
"Pre-Interview Communication", U.S. Appl. No. 14/959,901, dated Feb. 10, 2017, 3 pages.
"Final Office Action", U.S. Appl. No. 14/959,799, dated Jan. 4, 2018, 17 pages.
"Final Office Action", U.S. Appl. No. 14/959,730, dated Nov. 22, 2017, 16 pages.
"International Search Report and Written Opinion", PCT/US20171047691, dated Nov. 16, 2017, 13.
"International Search Report and Written Opinion", PCT Application No. PCT/US2017/051663, dated Nov. 29, 2017, 16 pages.
"Non-Final Office Action", U.S. Appl. No. 14/504,121, dated Jan. 2, 2018, 19 pages.
"Non-Final Office Action", U.S. Appl. No. 14/959,901, dated Jan. 8, 2018, 21 pages.
"Non-Final Office Action", U.S. Appl. No. 14/504,139, dated Oct. 18, 2017, 12 pages.
"Non-Final Office Action", U.S. Appl. No. 15/595,649, dated Oct. 31, 2017, 16 pages.
"Non-Final Office Action", U.S. Appl. No. 14/862,409, dated Dec. 14, 2017, 17 pages.
"Notice of Allowance", U.S. Appl. No. 15/403,066, dated Jan. 8, 2018, 18 pages.
"Notice of Allowance", U.S. Appl. No. 14/874,955, dated Oct. 20. 2017, 7 pages.
"Notice of Allowance", U.S. Appl. No. 15/398,147, dated Nov. 15, 2017, 8 pages.
"Notice of Publication", U.S. Appl. No. 15/703,511, dated Jan. 4, 2018, 1 page.
"Restriction Requirement", U.S. Appl. No. 15/362,359, dated Jan. 8, 2018, 5 pages.
Bondade, et al., "A linear-assisted DC-DC hybrid power converter for envelope tracking RF power amplifiers", 2014 IEEE Energy Conversion Congress and Exposition (ECCE), IEEE, Sep. 14, 2014, pp. 5769-5773, XP032680873, DOI: 10.1109/ECCE.2014.6954193, Sep. 14, 2014, 5 pages.
Fan, et al., "Wireless Hand Gesture Recognition Based on Continuous-Wave Doppler Radar Sensors", IEEE Transactions on Microwave Theory and Techniques, Plenum, USA, vol. 64, No. 11, Nov. 1, 2016 (Nov. 1, 2016), pp. 4012-4012, XP011633246, ISSN: 0018-9480, DOI: 101109/TMTT.2016.2610427, Nov. 1, 2016, 9 pages.
Lien, et al., "Soli: Ubiquitous Gesture Sensing with Millimeter Wave Radar", ACM Transactions on Graphics (TOG), ACM, Us, vol. 35, No. 4, Jul. 11, 2016 (Jul. 11, 2016), pp. 1-19, XP058275791, ISSN: 0730-0301, DOI: 10.1145/2897824.2925953, Jul. 11, 2016, 19 pages.
Martinez-Garcia, et al., "Four-quadrant linear-assisted DC/DC voltage regulator", Analog Integrated Circuits and Signal Processing, Springer New York LLC, US, vol. 88, No. 1, Apr. 23, 2016 (Apr. 23, 2016), pp. 151-160, XP035898949, ISSN: 0925-1030, DOI: 10.1007/S10470-016-0747-8, Apr. 23, 2016, 10 pages.
Skolnik, "CW and Frequency-Modulated Radar", In: "Introduction to Radar Systems", Jan. 1, 1981 (Jan. 1, 1981), McGraw Hill, XP055047545, ISBN: 978-0-07-057909-5 pp. 68-100, p. 95-p. 97, Jan. 1, 1981, 18 pages.
Zheng, et al., "Doppler Bio-Signal Detection Based Time-Domain Hand Gesture Recognition", 2013 IEEE MTT-S International Microwave Workshop Series on RF and Wireless Technologies for Biomedical and Healthcare Applications (IMWS-BIO), IEEE, Dec. 9, 2013 (Dec. 9, 2013), p. 3, XP032574214, DOI: 10.1109/IMWS-BIO.2013.6756200, Dec. 9, 2013, 3 Pages.
"Corrected Notice of Allowance", U.S. Appl. No. 14/312,486, dated Oct. 28, 2016, 4 pages.
"Non-Final Office Action", U.S. Appl. No. 14/518,863, dated Oct. 14, 2016, 16 pages.
"Notice of Allowance", U.S. Appl. No. 14/312,486, dated Oct. 7, 2016, 15 pages.
"Notice of Allowance", U.S. Appl. No. 14/582,896, dated Nov. 7, 2016, 5 pages.
"Pre-Interview Communication", U.S. Appl. No. 14/513,875, dated Oct. 21, 2016, 3 pages.
Pu,"Gesture Recognition Using Wireless Signals", Oct. 2014, pp. 15-18.
"Corrected Notice of Allowance", U.S. Appl. No. 15/362,359, dated Sep. 17, 2018, 10 pages.
"Final Office Action", U.S. Appl. No. 14/504,121, dated Jul. 9, 2018, 23 pages.
"Final Office Action", U.S. Appl. No. 15/166,198, dated Sep. 27, 2018, 33 pages.
"Foreign Office Action", Japanese Application No. 2018-501256, dated Jul. 24, 2018, 11 pages.
"Non-Final Office Action", U.S. Appl. No. 15/287,253, dated Jul. 7, 2018, 20 pages.
"Non-Final Office Action", U.S. Appl. No. 14/504,139, dated Oct. 5, 2018, 16 pages.
"Non-Final Office Action", U.S. Appl. No. 15/286,512, dated Jul. 19, 2018, 15 pages.
"Non-Final Office Action", U.S. Appl. No. 15/142,829, dated Aug. 16, 2018, 15 pages.
"Notice of Allowance", U.S. Appl. No. 15/362,359, dated Aug. 3, 2018, 8 pages.
"Notice of Allowance", U.S. Appl. No. 14/874,955, dated Oct. 4, 2018, 8 pages.
"Notice of Allowance", U.S. Appl. No. 15/142,619, dated Aug. 13, 2018, 9 pages.
"Notice of Allowance", U.S. Appl. No. 15/595,649, dated Sep. 14, 2018, 8 pages.

(56) References Cited

OTHER PUBLICATIONS

"Notice of Allowance", U.S. Appl. No. 15/586,174, dated Sep. 24, 2018, 5 pages.
"Pre-Interview Communication", U.S. Appl. No. 15/286,495, dated Sep. 10, 2018, 4 pages.
"Pre-Interview Communication", U.S. Appl. No. 15/287,359, dated Jul. 24, 2018, 2 pages.
"Restriction Requirement", U.S. Appl. No. 15/286,537, dated Aug. 27, 2018, 8 pages.
"Apple Watch Used Four Sensors to Detect your Pulse", retrieved from http://www.theverge.com/2014/9/9/6126991 / apple-watch-four-back-sensors-detect-activity on Sep. 23, 2017 as cited in PCT search report for PCT Application No. PCT/US2016/026756 dated Nov. 10, 2017; the Verge, paragraph 1, Sep. 9, 2014, 4 pages.
"Clever Toilet Checks on Your Health", CNN.Com; Technology, Jun. 28, 2005, 2 pages.
"Final Office Action", U.S. Appl. No. 14/681,625, dated Dec. 7, 2016, 10 pages.
"Final Office Action", U.S. Appl. No. 14/731,195, dated Oct. 11, 2018, 12 pages.
"Final Office Action", U.S. Appl. No. 14/715,454, dated Sep. 7, 2017, 14 pages.
"Final Office Action", U.S. Appl. No. 15/286,512, dated Dec. 26, 2018, 15 pages.
"Final Office Action", U.S. Appl. No. 14/720,632, dated Jan. 9, 2018, 18 pages.
"Final Office Action", U.S. Appl. No. 14/715,454, dated Apr. 17, 2018, 19 pages.
"Final Office Action", U.S. Appl. No. 15/287,308, dated Feb. 8, 2019, 23 pages.
"Final Office Action", U.S. Appl. No. 14/599,954, dared Aug. 10, 2016, 23 pages.
"Final Office Action", U.S. Appl. No. 14/699,181, dated May 4, 2018, 41 pages.
"Final Office Action", U.S. Appl. No. 14/715,793, dated Sep. 12, 2017, 7 pages.
"Final Office Action", U.S. Appl. No. 14/809,901, dated Dec. 13, 2018, 7 pages.
"First Action Interview OA", U.S. Appl. No. 14/715,793, dated Jun. 21, 2017, 3 pages.
"First Action Interview Office Action", U.S. Appl. No. 15/142,471, dated Feb. 5, 2019, 29 pages.
"First Action Interview Office Action", U.S. Appl. No. 14/731,195, dated Jun. 21, 2018, 4 pages.
"First Action Interview Pilot Program Pre-Interview Communication", U.S. Appl. No. 14/731,195, dated Aug. 1, 2017, 3 pages.
"First Examination Report", GB Application No. 1621332.4, dated May 16, 2017, 7 pages.
"Foreign Office Action", Chinese Application No. 201580034536.8, dated Oct. 9, 2018.
"Foreign Office Action", KR Application No. 10-2016-7036023, dated Aug. 11, 2017, 10 pages.
"Foreign Office Action", Chinese Application No. 201580036075.8, dated Jul. 4, 2018, 14 page.
"Foreign Office Action", CN Application No. 201580034908.7, dated Jul. 3, 2018, 17 pages.
"Foreign Office Action", JP App. No. 2016-567813, dated Jan. 16, 2018, 3 pages.
"Foreign Office Action", Korean Application No. 10-2016-7036015, dated Oct. 15, 2018, 3 pages.
"Foreign Office Action", Japanese Application No. 2016-567839, dated Apr. 3, 2018, 3 pages.
"Foreign Office Action", KR Application No. 10-2016-7035397, dated Sep. 20, 2017, 5 pages.
"Foreign Office Action", Korean Application No. 1020187012629, dated May 24, 2018, 6 pages.
"Foreign Office Action", EP Application No. 15170577.9, dated May 30, 2017, 7 pages.
"Foreign Office Action", Korean Application No. 10-2016-7036396, dated Jan. 3, 2018, 7 pages.
"Foreign Office Action", JP Application No. 2016567813, dated Sep. 22, 2017, 8 pages.
"Foreign Office Action", Japanese Application No. 2018021296, dated Dec. 25, 2018, 8 pages.
"Foreign Office Action", EP Application No. 15754323.2, dated Mar. 9, 2018, 8 pages.
"Foreign Office Action—Needs Translation", Japanese Application No. 2018501256, dated Feb. 26, 2019, 3 pages.
"International Preliminary Report on Patentability", PCT Application No. PCT/US2017/032733, dated Nov. 29, 2018, 7 pages.
"International Preliminary Report on Patentability", PCT Application No. PCT/US2016/026756, dated Oct. 19, 2017, 8 pages.
"International Search Report and Written Opinion", PCT Application No. PCT/US2016/065295, dated Mar. 14, 2017, 12 pages.
"International Search Report and Written Opinion", Application No. PCT/US2016/042013, dated Oct. 26, 2016, 12 pages.
"International Search Report and Written Opinion", Application No. PCT/US2016/034366, dated Nov. 17, 2016, 13 pages.
"International Search Report and Written Opinion", Application No. PCT/US2016/033342, dated Oct. 27, 2016, 20 pages.
"Life:X Lifestyle eXplorer", Retrieved from <https://web.archive.org/web/20150318093841/http://research.microsoft.com/en-us/projects/lifex >, Feb. 3, 2017, 2 pages.
"Non-Final Office Action", U.S. Appl. No. 15/596,702, dated Jan. 4, 2019, 10 pages.
"Non-Final Office Action", U.S. Appl. No. 15/286,837, dated Oct. 26, 2018, 10 pages.
"Non-Final Office Action", U.S. Appl. No. 14/666,155, dated Feb. 3, 2017, 12 pages.
"Non-Final Office Action", U.S. Appl. No. 14/809,901, dated May 24, 2018, 13 pages.
"Non-Final Office Action", U.S. Appl. No. 14/720,632, dated Jun. 14, 2017, 16 pages.
"Non-Final Office Action", U.S. Appl. No. 14/715,454, dated Jan. 11, 2018, 16 pages.
"Non-Final Office Action", U.S. Appl. No. 14/599,954, dated Jan. 26, 2017, 16 pages.
"Non-Final Office Action", U.S. Appl. No. 14/599,954, dated Feb. 2, 2016, 17 pages.
"Non-Final Office Action", U.S. Appl. No. 15/287,308, dated Oct. 15, 2018, 18 pages.
"Non-Final Office Action", U.S. Appl. No. 15/286,537, dated Nov. 19, 2018, 18 pages.
"Non-Final Office Action", U.S. Appl. No. 14/720,632, dated May 18, 2018, 20 pages.
"Non-Final Office Action", U.S. Appl. No. 14/959,901, dated Oct. 11, 2018, 22 pages.
"Non-Final Office Action", U.S. Appl. No. 15/286,152, dated Oct. 19, 2018, 27 pages.
"Non-Final Office Action", U.S. Appl. No. 14/699,181, dated Oct. 18, 2017, 33 pages.
"Non-Final Office Action", U.S. Appl. No. 15/166,198, dated Feb. 21, 2019, 48 pages.
"Non-Final Office Action", U.S. Appl. No. 14/681,625, dated Mar. 6, 2017, 7 pages.
"Non-Invasive Quantification of Peripheral Arterial Volume Distensibilitiy and its Non-Lineaer Relationship with Arterial Pressure", Journal of Biomechanics, Pergamon Press, vol. 42, No. 8; as cited in the search report for PCT/US2016/013968 citing the whole document, but in particular the abstract, dated May 29, 2009, 2 pages.
"Notice of Allowance", U.S. Appl. No. 14/599,954, dated May 24, 2017, 11 pages.
"Notice of Allowance", U.S. Appl. No. 15/287,200, dated Nov. 6, 2018, 19 pages.
"Notice of Allowance", U.S. Appl. No. 15/286,152, dated Mar. 5, 2019, 23 pages.
"Notice of Allowance", U.S. Appl. No. 14/715,793, dated Jul. 6, 2018, 5 pages.
"Notice of Allowance", U.S. Appl. No. 15/286,495, dated Jan. 17, 2019, 5 pages.
"Notice of Allowance", U.S. Appl. No. 15/595,649, dated Jan. 3, 2019, 5 pages.

(56) References Cited

OTHER PUBLICATIONS

"Notice of Allowance", U.S. Appl. No. 14/715,793, dated Dec. 18, 2017, 5 pages.
"Notice of Allowance", U.S. Appl. No. 14/666,155, dated Feb. 20, 2018, 5 pages.
"Notice of Allowance", U.S. Appl. No. 14/666,155, dated Jul. 10, 2017, 7 pages.
"Notice of Allowance", U.S. Appl. No. 14/681,625, dated Jun. 7, 2017, 7 pages.
"Notice of Allowance", U.S. Appl. No. 14/681,625, dated Oct. 23, 2017, 8 pages.
"Notice of Allowance", U.S. Appl. No. 15/142,829, dated Feb. 6, 2019, 8 pages.
"Notice of Allowance", U.S. Appl. No. 15/142,689, dated Oct. 30, 2018, 9 pages.
"Notice of Allowance", U.S. Appl. No. 14/504,137, dated Feb. 6, 2019, 9 pages.
"Pre-Interview Communication", U.S. Appl. No. 15/142,471, dated Dec. 12, 2018, 3 pages.
"Pre-Interview Communication", U.S. Appl. No. 14/715,793, dated Mar. 20, 2017, 3 pages.
"Pre-Interview Communication", U.S. Appl. No. 14/715,454, dated Apr. 14, 2017, 3 pages.
"Pre-Interview Communication", U.S. Appl. No. 15/703,511, dated Feb. 22, 2019, 5 pages.
"Pre-Interview Office Action", U.S. Appl. No. 14/731,195, dated Dec. 20, 2017, 4 pages.
"Preliminary Report on Patentability", PCT Application No. PCT/US2016/065295, dated Jul. 24, 2018, 18 pages.
"Preliminary Report on Patentability", PCT Application No. PCT/US2016/042013, dated Jan. 30, 2018, 7 pages.
"Preliminary Report on Patentability", PCT Application No. PCT/US2016/032307, dated Dec. 7, 2017, 9 pages.
"Pressure-Volume Loop Analysis in Cardiology", retrieved from https://en.wikipedia.org/w/index.php?title=Pressure-volume loop analysis in card iology&oldid=636928657 on Sep. 23, 2017; Obtained per link provided in search report from PCT/US2016/01398 dated Jul. 28, 2016, Dec. 6, 2014, 10 pages.
"Restriction Requirement", U.S. Appl. No. 15/462,957, dated Jan. 4, 2019, 6 pages.
"Restriction Requirement", U.S. Appl. No. 15/352,194, dated Feb. 6, 2019, 8 pages.
"The Dash smart earbuds play back music, and monitor your workout", Retrieved from < http://newatlas.com/bragi-dash-tracking-earbuds/30808/>, Feb. 13, 2014, 3 pages.
"Thermofocus No Touch Forehead Thermometer", Technimed, Internet Archive. Dec. 24, 2014. https://web.archive.org/web/20141224070848/http://www.tecnimed.it:80/thermofocus-forehead-thermometer-H1N1-swine-flu.html, Dec. 24, 2018, 4 pages.
"Written Opinion", PCT Application No. PCT/US2016/042013, dated Feb. 2, 2017, 6 pages.
"Written Opinion", PCT Application No. PCT/US2016/026756, dated Nov. 10, 2016, 7 pages.
"Written Opinion", PCT Application No. PCT/US2017/051663, dated Oct. 12, 2018, 8 pages.
"Written Opinion", PCT Application No. PCT/US2016/065295, dated Apr. 13, 2018, 8 pages.
"Written Opinion", PCT Application PCT/US2016/013968, dated Jul. 28, 2016, 9 pages.
Antonimuthu, "Google's Project Soli brings Gesture Control to Wearables using Radar", YouTube[online], Available from https://www.youtube.com/watch?v=czJfcgvQcNA as accessed on May 9, 2017; See whole video, especially 6:05-6:35.
Duncan, David P., "Motion Compensation of Synthetic Aperture Radar", Microwave Earth Remote Sensing Laboratory, Brigham Young University, Apr. 15, 2003, 5 pages.
Garmatyuk, Dmitriy S. et al., "Ultra-Wideband Continuous-Wave Random Noise Arc-SAR", IEEE Transaction on Geoscience and Remote Sensing, vol. 40, No. 12, Dec. 2002, Dec. 2002, 10 pages.
Geisheimer, Jonathan L. et al., "A Continuous-Wave (CW) Radar for Gait Analysis", IEEE 2001, 2001, 5 pages.
GürbüZ, Sevgi Z. et al., "Detection and Identification of Human Targets in Radar Data", Proc. SPIE 6567, Signal Processing, Sensor Fusion, and Target Recognition XVI, 656701, May 7, 2007, 12 pages.
Ishijima, Masa, "Unobtrusive Approaches to Monitoring Vital Signs at Home", Medical & Biological Engineering and Computing, Springer, Berlin, DE, vol. 45, No. 11 as cited in search report for PCT/US2016/013968 dated Jul. 28, 2016, Sep. 25, 2007, 3 pages.
Klabunde, Richard E., "Ventricular Pressure-Volume Loop Changes in Valve Disease", Retrieved From <https://web.archive.org/web/20101201185256/http://cvphysiology.com/Heart%20Disease/HD009.htm>, Dec. 1, 2010, 8 pages.
Kubota, Yusuke et al., "A Gesture Recognition Approach by using Microwave Doppler Sensors", IPSJ SIG Technical Report, 2009 (6), Information Processing Society of Japan, Apr. 15, 2010, pp. 1-8, Apr. 15, 2010, 13 pages.
Matthews, Robert J., "Venous Pulse", Retrieved at: http://www.rjmatthewsmd.com/Definitions/venous_pulse.htm—on Nov. 30, 2016, Apr. 13, 2013, 7 pages.
Otto, Chris et al., "System Architecture of a Wireless Body Area Sensor Network for Ubiquitous Health Monitoring", Journal of Mobile Multimedia; vol. 1, No. 4, Jan. 10, 2006, 20 pages.
Palese, et al., "The Effects of Earphones and Music on the Temperature Measured by Infrared Tympanic Thermometer: Preliminary Results", ORL—head neck nursing: official journal of the Society of Otorhinolaryngology and Head-Neck Nurses 32.2, Jan. 1, 2013, p. 8-12.
Pu, Qifan et al., "Whole-Home Gesture Recognition Using Wireless Signals", MobiCom'13, Sep. 30-Oct. 4, Miami, FL, USA, 2013, 12 pages.
Pu, Qifan et al., "Whole-Home Gesture Recognition Using Wireless Signals", Proceedings of the 19th annual international conference on Mobile computing & networking (MobiCom'13), US, ACM, Sep. 30, 2013, pp. 27-38, Dec. 30, 2013, 12 pages.
Zhadobov, Maxim et al., "Millimeter-Wave Interactions with the Human Body: State of Knowledge and Recent Advances", International Journal of Microwave and Wireless Technologies, p. 1 of 11. # Cambridge University Press and the European Microwave Association, 2011 doi:10.1017/S1759078711000122, 2011.
"Final Office Action", U.S. Appl. No. 15/286,537, dated Apr. 19, 2019, 21 pages.
"Final Office Action", U.S. Appl. No. 15/287,253, dated Apr. 2, 2019, 10 pages.
"Final Office Action", U.S. Appl. No. 14/959,901, dated May 30, 2019, 18 pages.
"Non-Final Office Action", U.S. Appl. No. 15/287,394, dated Mar. 22, 2019, 39 pages.
"Non-Final Office Action", U.S. Appl. No. 16/238,464, dated Mar. 7, 2019, 15 pages.
"Non-Final Office Action", U.S. Appl. No. 15/424,263, dated May 23, 2019, 12 pages.
"Non-Final Office Action", U.S. Appl. No. 15/462,957, dated May 24, 2019, 14 pages.
"Notice of Allowance", U.S. Appl. No. 15/286,837, dated Mar. 6, 2019, 7 pages.
"Notice of Allowance", U.S. Appl. No. 15/703,511, dated Apr. 16, 2019, 5 pages.
"Notice of Allowance", U.S. Appl. No. 15/286,512, dated Apr. 9, 2019, 14 pages.
"Pre-Interview Communication", U.S. Appl. No. 15/917,238, dated May 1, 2019, 6 pages.
"Final Office Action", U.S. Appl. No. 15/142,471, dated Jun. 20, 2019, 26 pages.
"Final Office Action", U.S. Appl. No. 16/238,464, dated Jul. 25, 2019, 15 pages.
"First Action Interview Office Action", U.S. Appl. No. 15/917,238, dated Jun. 6, 2019, 6 pages.
"International Preliminary Report on Patentability", PCT Application No. PCT/US2017/051663, dated Jun. 20, 2019, 10 pages.
"Non-Final Office Action", U.S. Appl. No. 15/286,537, dated Sep. 3, 2019, 28 Pages.

(56) References Cited

OTHER PUBLICATIONS

"Notice of Allowance", U.S. Appl. No. 15/287,308, dated Jul. 17, 2019, 17 Pages.
"Notice of Allowance", U.S. Appl. No. 15/917,238, dated Aug. 21, 2019, 13 pages.
"Notice of Allowance", U.S. Appl. No. 16/389,402, dated Aug. 21, 2019, 7 Pages.
"Notice of Allowance", U.S. Appl. No. 15/287,253, dated Aug. 26, 2019, 13 Pages.
"Notice of Allowance", U.S. Appl. No. 15/352,194, dated Jun. 26, 2019, 8 pages.

* cited by examiner

US 10,459,080 B1

RADAR-BASED OBJECT DETECTION FOR VEHICLES

PRIORITY

This application claims priority to U.S. Provisional Patent Application Ser. No. 62/237,975 filed on Oct. 6, 2015, the disclosure of which is incorporated by reference herein in its entirety.

BACKGROUND

This background description is provided for the purpose of generally presenting the context of the disclosure. Unless otherwise indicated herein, material described in this section is neither expressly nor impliedly admitted to be prior art to the present disclosure or the appended claims.

Vehicles, such as automobiles, boats, or aircrafts, can be dangerous when the driver of the vehicle fails to pay attention to driving. This may also be the case in autonomous driving experiences, where the driver may be relied upon as a fallback mechanism in the event that the autonomous driving system fails or is unable to handle a particular type of navigation.

SUMMARY

This document describes techniques and devices for radar-based object detection for vehicles. The techniques describe a radar-based object detection component implemented in a vehicle that is configured to detect characteristics of persons within the vehicle, such as a driver or other passengers. Then, based on the detected characteristics, an activity of the person can be determined and various operations can be initiated based on the activity, such as initiating a warning when the driver is not paying attention to driving, automatically slowing down the vehicle, and so forth. In some cases, the radar-based object detection component can also be implemented to detect characteristics of objects positioned external to the vehicle, such as pedestrians, other vehicles, foreign objects in the road, and so forth. The radar-based object detection component may also be implemented to authenticate a driver of the vehicle, such as by detecting biometric characteristics of the driver or recognizing a series of gestures corresponding to an authentication sequence. This Summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Various aspects of radar-based object detection for vehicles are described with reference to the following drawings. The same numbers are used throughout the drawings to reference like features and components.

DETAILED DESCRIPTION

Overview

Figure 1:
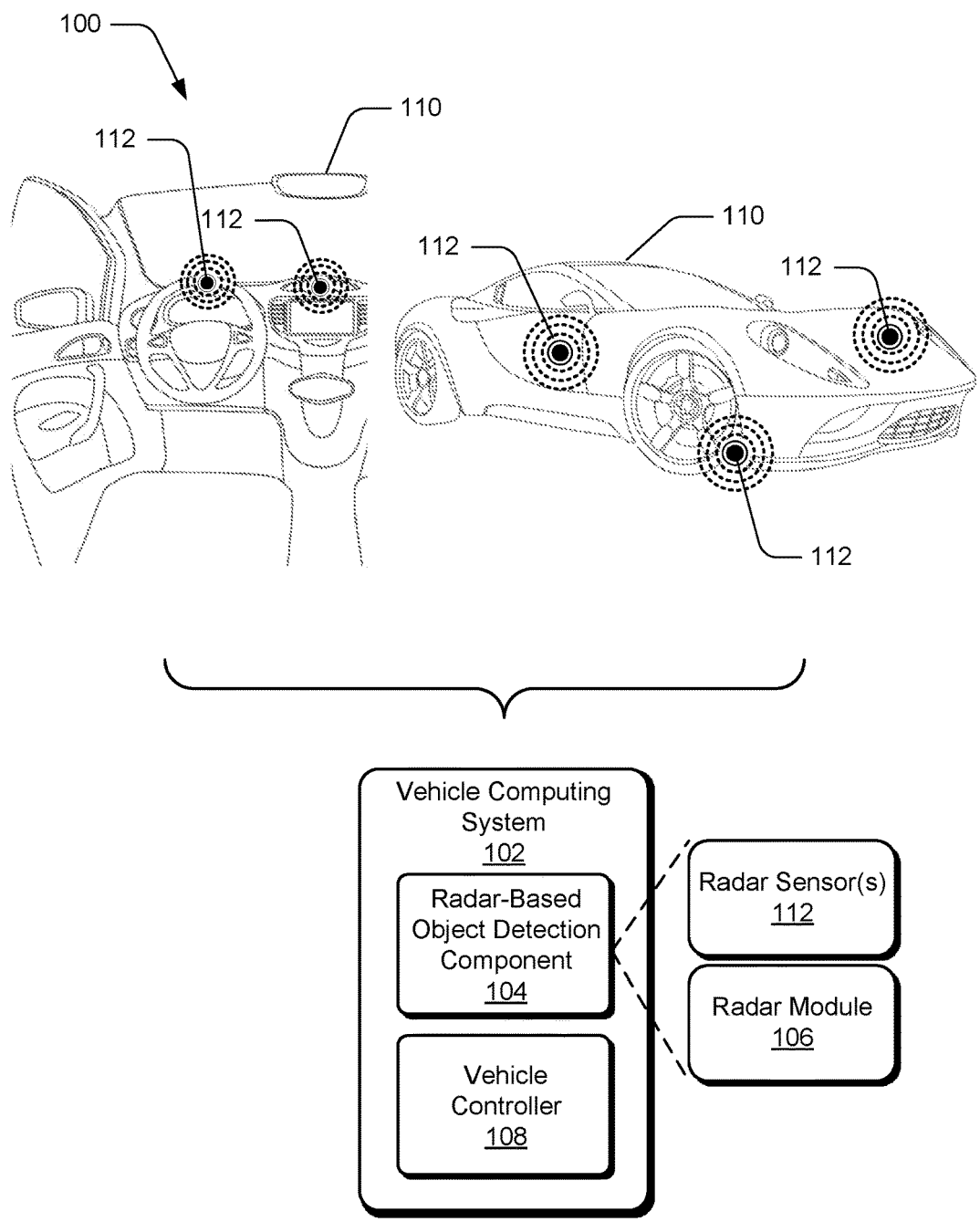
FIG. 1 is an illustration of an environment in an example implementation that is operable to employ radar-based object detection for a vehicle.

This document describes techniques and devices for radar-based object detection for vehicles. The techniques describe a radar-based object detection component for a vehicle (e.g., an automobile, boat, or plane) that is configured to detect various characteristics of persons with the vehicle (e.g., a driver and passengers), as well as characteristics of objects external to the vehicle (e.g., pedestrians, other vehicles, or foreign objects in the road).

For example, the radar-based object detection component can monitor a presence and attention level of a driver of the vehicle while the vehicle is moving by initiating transmission of an outgoing RF signal via a radar-emitting element of a radar sensor, receiving, via an antenna of the radar sensor, an incoming RF signal generated by the outgoing RF signal reflecting off the driver of the vehicle, and analyzing the incoming RF signal to detect one or more characteristics of the driver. Such characteristics, for example, can include a position and movement of the driver's body or a specific body part, such as the driver's hands, mouth, eyes, and so forth.

Then, based on the detected characteristics, the radar-based object detection component can determine an activity of the driver. As described herein, an activity of the driver corresponds to an activity currently being performed by the driver, such as driving with one or both hands on the steering wheel, being awake, drowsy, or asleep, interacting with a mobile device (e.g., texting), looking straight ahead, sideways, or backwards, talking (e.g., to a passenger in the vehicle or during a phone call), sitting somewhere other than the driver's seat (e.g., in an autonomous driving experience), looking in the glove compartment, and so forth. Based on the determined activity, one or more operations can be initiated. Generally, the operations improve the driving experience, increase the safety of the driving experience, provide security for the vehicle, or control navigation of the vehicle.

For example, in some cases, the radar-based object detection component determines an attention level of the driver, based on the activity, and then initiates the one or more operations based on the determined attention level. For example, activities such as texting, looking backwards, or being drowsy or sleepy, may be indicative of a low attention level. In contrast, activities such as driving with both hands on the wheel are indicative of a high attention level. Thus, in some cases, a warning (e.g., audible, visual, or tactile) may be initiated, in response to determining that the driver has a low attention level, in order to alert the driver to pay attention to driving. In this way, the radar-based object detection component monitors the driver without requiring the driver's deliberate or conscious interaction with the system.

In one or more implementations, the radar-based object detection component monitors the presence and attention level of the driver in an autonomous or semi-autonomous vehicle system. Autonomous vehicles are developed to navigate and operate either unmanned or to assist a vehicle operator, and can utilize many different types of sensors, automation, robotics, and other computer-controlled systems and mechanisms. However, in many cases, the driver must still act as a "fallback mechanism" in order to handle driving duties in certain instances where the autonomous system fails or is unable to control navigation. In these cases, the radar-based object detection component may monitor the driver's presence and attention level to ensure that the driver is a suitable backup in the event that the autonomous system needs to switch over to the manual system. In the event that the driver's attention is low, or the driver is not present in the driver's seat, the component may initiate various warnings to ensure that the driver is reminded that he may be needed as a fallback mechanism. Furthermore, in some cases, the radar-based object detection component may prevent a transition from an autonomous driving mode to a manual driving mode if the attention level of the driver is below a threshold indicating that the driver is not paying attention or is not present in the driver's seat. As another example, if the system is in autonomous driving mode or cruise control mode, the component may detect if the driver has a low attention level, and in response, cause the vehicle to slow down while at the same time alerting the driver.

Similar techniques may also be applied to passengers within the vehicle. For example, radar-emitting elements and antennas may be positioned in the rear of the vehicle to monitor a toddler or baby, and may provide status updates to the driver, such as to let the driver know that the baby is sleeping, waking up, or choking on a piece of food.

In one or more implementations, the radar-based object detection system may also include radar-emitting elements and antennas positioned on the exterior of the vehicle in order to sense and detect various external objects, such as pedestrians, other vehicles, debris or foreign objects in the road, objects on the side of the road, and so forth. The detection of such external objects may be used as part of the autonomous driving experience, as part of a "cruise control" experience, or in order to provide a warning (or automatic braking) when objects are detected in close proximity to the driving path (e.g., when a pedestrian steps into the road in front of the vehicle).

In one or more implementations, the radar-based object detection component is further configured to augment a keyless entry systems to verify that a person is actually present, or as part of an authentication procedure to authenticate the driver as a known person permitted to drive the vehicle. For example, the component may prevent the car from being driven unless the driver is authenticated as a known person permitted to drive the vehicle. In order to authenticate the driver, the component may detect biometric characteristics of the driver (e.g., a height or skeletal structure) and/or a series of "in air" gestures corresponding to a specific authentication sequence.

Example Environment

FIG. 1 is an illustration of an environment 100 in an example implementation that is operable to employ radar-based object detection in a vehicle. The illustrated environment 100 includes a vehicle computing system 102, which is configurable in a variety of ways and includes a radar-based object detection component 104, a radar module 106, and a vehicle controller 108. The vehicle computing system 102 may be incorporated as part of a vehicle 110, which in this example is illustrated as an automobile, but may include any type of vehicle such as a boat, plane, train, and so forth.

As used herein, the term "automobile" refers to a passenger vehicle designed for operation on roads and having one or more engines used rotate to wheels causing the automobile to be propelled. Examples of automobiles include cars, trucks, sport utility vehicles, vans, and the like. In one or more implementations, vehicle 110 is "autonomous" or at least "partially autonomous". Autonomous vehicles are developed to navigate and operate either unmanned or to assist a vehicle operator, and can utilize many different types of sensors, automation, robotics, and other computer-controlled systems and mechanisms.

In this example, radar-based object detection component 104 is a hardware component of vehicle computing system 102. The radar-based object detection component 104 is configurable to detect objects in three dimensions, such as to identify the object, an orientation of the object, and/or movement of the object.

In order to detect object characteristics, radar-based object detection system 104 includes one or more radar sensors 112. Generally, radar sensors 112 include one or more antennas that are configured to transmit one or more RF signals. As a transmitted signal reaches an object (e.g., the driver of vehicle 110), at least a portion reflects back to the radar sensor 112 and is processed, as further described below, in order to detect characteristics of the object. In some cases, each radar sensor 112 includes a radar-emitting element configured to transmit the RF signal, and an antenna configured to capture the reflections of the RF signal. However, the radar sensor can include different combinations of radar-emitting elements and antennas. For instance, a single antenna could be utilized to capture reflections from three different radar-emitting elements, or vice versa. The RF signals can have any suitable combination of energy level, carrier frequency, burst periodicity, pulse width, modulation type, waveform, phase relationship, and so forth. In some cases, some or all of the respective signals transmitted in the RF signals differs from one another to create a specific diversity scheme, such as a time diversity scheme that transmits multiple versions of a same signal at different points in time, a frequency diversity scheme that transmits signals using several different frequency channels, a space diversity scheme that transmits signals over different propagation paths, etc.

Radar-based object detection component 104 can be implemented with just one, or multiple radar sensors 112. For example, in some cases, a single radar sensor 112 can be positioned proximate the driver's seat of the vehicle 110 (e.g., on the steering wheel or dashboard) in order to capture characteristics of the driver of vehicle 110. In other cases, multiple radar sensors 112 can be positioned throughout the interior of vehicle 110 in order to detect characteristics of the driver, as well as other passengers within the vehicle. In this example, radar sensors 112 are also shown as being positioned on the exterior of vehicle 110 in order to detect characteristics of objects external to vehicle 110, such as pedestrians, other vehicles, or foreign objects (e.g., trees, buildings, or debris in the road). For example, radar sensors 112 could be positioned on the front of the exterior of the vehicle in order to detect characteristics of objects within the path of the moving vehicle, as well as on the sides and rear of the exterior of vehicle 110.

The radar module 106 is representative of functionality to detect the presence or activity of persons within the vehicle 110, or objects external to the vehicle 110, and to initiate various operations based on the detection. For example, the radar module 106 may receive inputs from the radar sensors 112 that are usable to detect characteristics or attributes to identify an object (e.g., the driver of vehicle 110, a passenger, or objects located outside of the vehicle), orientation of the object, and/or movement of the object. Based on recognition of a combination of one or more of the characteristics or attributes, the radar module 106 may initiate an operation.

When radar sensors 112 are positioned proximate to the driver of vehicle 110, the radar-based object detection component 104 can monitor a presence and attention level of a driver of vehicle 110 while the vehicle is moving by initiating transmission of an outgoing RF signal via the radar sensors 112 (e.g., via a radar-emitting element), and receiving, via the radar sensor 112 (e.g., via an antenna), an incoming RF signal generated by the outgoing RF signal reflecting off the driver of the vehicle 110. Radar-based object detection component 104 can then analyze the incoming RF signal to detect one or more characteristics of the driver. Such characteristics, for example, can include a position and movement of the driver's body or a specific body part, such as the driver's hands, mouth, eyes, and so forth.

Then, based on the detected characteristics, the radar module 106 can determine an activity of the driver. As described herein, an activity of the driver corresponds to an activity currently being performed by the driver, such as driving with one or both hands on the steering wheel, being awake, drowsy, or asleep, interacting with a mobile device (e.g., texting), looking straight ahead, sideways, or backwards, talking (e.g., talking with a passenger in the vehicle or talking during a phone call), sitting somewhere other than the driver's seat (e.g., in an autonomous driving experience), or looking in the glove compartment, to name just a few.

Based on the determined activity, the radar module 106 initiates one or more operations. In some cases, the one or more operations may be initiated by sending control signals to the vehicle controller 108, in order to cause the vehicle controller 108 to control the vehicle 110 to output audible warnings, visual notifications, control navigation of the vehicle (e.g., causing the vehicle to slow down or speed up), and so forth. For example, the vehicle controller can control the audio system of the vehicle 100 to output an audible warning, such as a loud beep, or voice narration that instructs the driver to "pay attention" or "wake up", or notifies the driver that "the baby is asleep". As another example, the vehicle controller 108 can control the navigation system of the vehicle (e.g., the cruise control system of autonomous driving system) based on the driver's activity, such as by slowing down when the driver is not paying attention.

In some cases, the radar module 106 determines an attention level of the driver, based on the activity, and then initiates the one or more operations based on the determined attention level. For example, activities such as texting, looking backwards, or being drowsy or sleepy, may be indicative of a low attention level. In contrast, activities such as driving with both hands on the wheel are indicative of a high attention level. Thus, in some cases, a warning (e.g., audible, visual, or tactile) may be initiated, in response to determining that the driver has a low attention level, in order to alert the driver to pay attention to driving. In this way, the radar module 106 monitors the driver without requiring the driver's deliberate or conscious interaction with the system.

In one or more implementations, in order to determine whether the driver is paying attention, the attention level is first determined as a score, based on the various detected characteristics of the driver. Then, the attention level is compared to a threshold. If the attention level of the driver is above the threshold, then radar module 106 determines that the driver is paying attention to driving vehicle 110. Alternately, if the attention level of the driver is below the threshold, then radar module 106 determines that the driver is not paying attention.

In one or more implementations, the radar-based object detection component 104 monitors the presences and attention level of the driver in an autonomous or semi-autonomous vehicle system. Autonomous vehicles are developed to navigate and operate either unmanned or to assist a vehicle operator, and can utilize many different types of sensors, automation, robotics, and other computer-controlled systems and mechanisms. However, in many cases, the driver must still act as a "fallback mechanism" in order to handle driving duties in certain instances where the autonomous system fails or is unable to control navigation. In these cases, the radar-based object detection component 104 may monitor the driver's presence and attention level to ensure that the driver is a suitable backup in the event that the autonomous system needs to switch over to the manual system. In the event that the driver's attention is low, or the driver is not present in the driver's seat, the component may initiate various warnings to ensure that the driver is reminded that he may be needed as a fallback mechanism. Furthermore, in some cases, the radar-based object detection component may prevent a transition from an autonomous driving mode to a manual driving mode if the attention level of the driver is below the threshold indicating that the driver is not paying attention or is not present in the driver's seat.

Similar techniques may also be applied to passengers within the vehicle. For example, radar sensors 112 may be positioned in the rear of the vehicle 110 to monitor a toddler or baby in order to determine an activity of the passenger, such as sleeping, waking up, choking on a piece of food, and so forth. Then, an operation may be initiated, based on the activity of the passenger, such as by alerting the driver that the baby is asleep, waking up, or choking on a piece of food.

In one or more implementations, the radar-based object detection component 104 is further configured to augment a keyless entry system for the vehicle to verify that a person is actually present, or as part of an authentication procedure to authenticate the driver as a known person permitted to drive the vehicle 110. For example, the radar sensor 112 can detect one or more biometric characteristics of the driver, such as height, skeletal structure, and so forth. Then, radar module 106 can compare the detected biometric characteristics of the driver to stored biometric characteristics of known persons that are permitted to drive the vehicle. If the detected biometric characteristics of the driver match the stored biometric characteristics, then radar module 106 authenticates the driver as a known person permitted to drive vehicle 110. Alternately or additionally, the radar sensor 112 can detect one or more gestures performed by the driver. Then, radar module 106 can compare the detected one or more gestures to stored gestures corresponding to an authentication sequence. If the detected gestures performed by the driver match the stored gestures, then radar module 106 authenticates the drive as a known person permitted to drive vehicle 110. In some cases, a two-stage authentication process may be applied, whereby the driver is authenticated based on biometric characteristics as well as detection of one or more recognized gestures performed by the driver. Once the driver is authenticated, the driver is then permitted to drive the vehicle. Alternately, if the driver is not authenticated, the driver may be prevented from driving the vehicle.

As described herein, biometric characteristics correspond to distinctive, measurable characteristics that can be used to identify a particular known person, or a particular "type" of person (e.g., an adult versus a child). Biometric characteristics are often categorized as physiological versus behavioral characteristics. Physiological characteristics are related to the shape of the body and may include, by way of example and not limitation, height, skeletal structure, fingerprint, palm veins, face recognition, DNA, palm print, hand geometry, iris recognition, retina scent, heart conditions, and so forth. Behavioral characteristics are related to the pattern of behavior of a person, including but not limited to a walking gait, typing rhythm, and so forth.

When radar sensors 112 are implemented on the exterior of vehicle 110, the radar module 106 can be implemented to detect characteristics of various external objects, such as pedestrians, other vehicles, debris or foreign objects in the road, objects on the side of the road, and so forth. Vehicle controller 108 may then control navigation of the vehicle based on the detected characteristics of external objects. The detection of such external objects may be used as part of the autonomous driving experience, as part of a "cruise control" experience, or in order to provide a warning (or automatic braking) when objects are detected in close proximity to the driving path (e.g., when a pedestrian steps into the road in front of the vehicle). For example, radar module 106 can recognize the detected characteristics as certain objects, such as a pedestrian or a vehicle. Vehicle controller 108 may then control navigation of vehicle 110 based on the recognized objects, such as by slowing down when a pedestrian steps in front of the vehicle, speeding up when a vehicle approaches quickly from the rear, or swerving when a vehicle approaches from the side.

Figure 2:
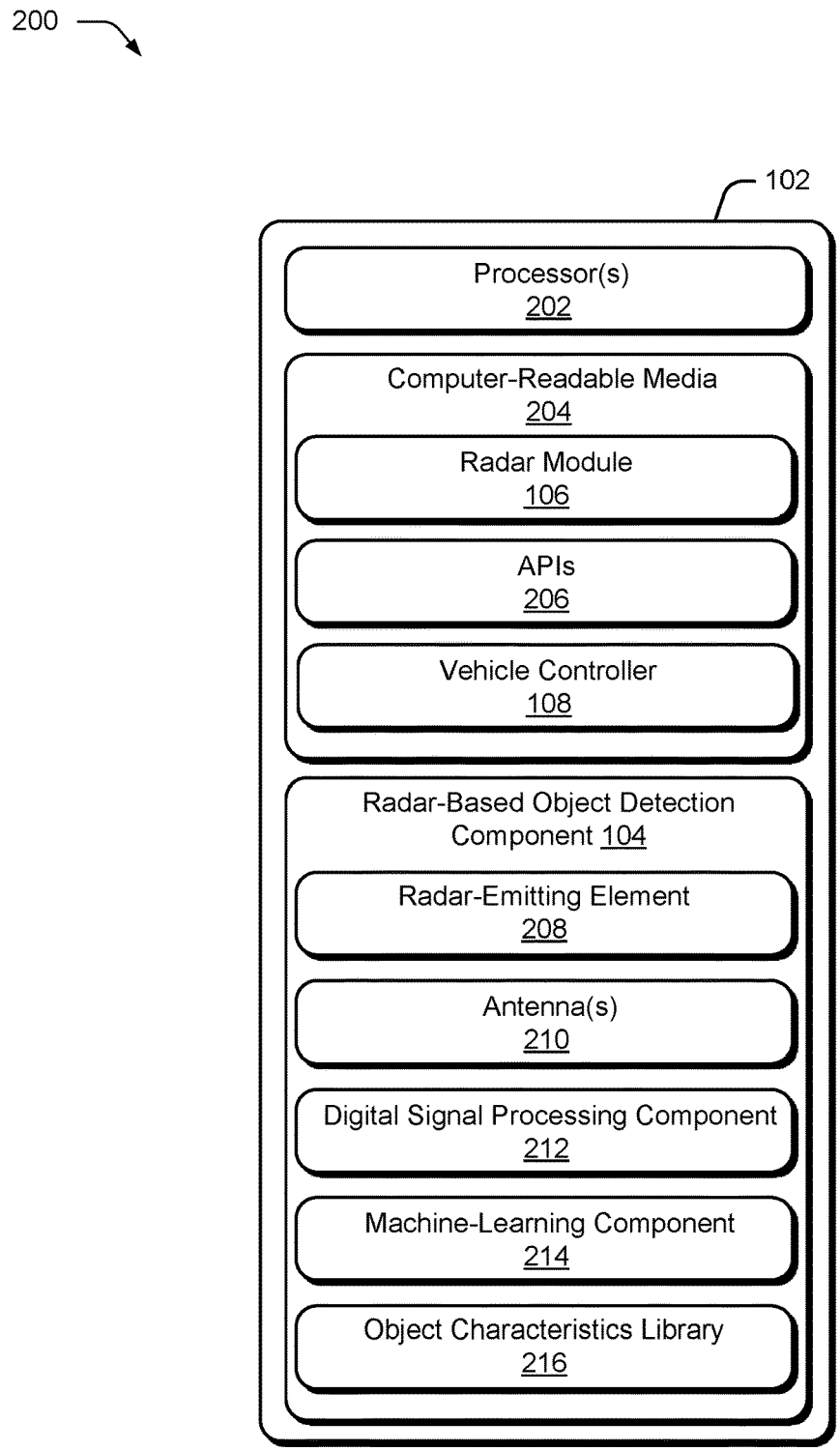
FIG. 2 illustrates an example implementation of the vehicle computing system of FIG. 1 in greater detail.

Having generally described an environment in which radar-based object detection for vehicles may be implemented, now consider FIG. 2, which illustrates an example implementation of vehicle computing system 102 of FIG. 1 in greater detail. As discussed above, vehicle computing system 102 represents any suitable type of computing system that is implemented within a vehicle, such as an automobile, plane, boat, and so forth.

Vehicle computing system 102 includes processor(s) 202 and computer-readable media 204. Radar module 106 and vehicle controller 108 from FIG. 1 embodied as computer-readable instructions on the computer-readable media 204 can be executed by the processor(s) 202 to invoke or interface with some or all of the functionalities described herein, such as through Application Programming Interfaces (APIs) 206.

APIs 206 provide programming access into various routines and functionality incorporated into radar-based object detection component 104. For instance, radar-based object detection component 104 can have a programmatic interface (socket connection, shared memory, read/write registers, hardware interrupts, etc.) that can be used in concert with APIs 206 to allow applications external to radar-based object detection component 104 a way to communicate or configure the component. In some embodiments, APIs 206 provide high-level access into radar-based object detection component 104 in order to abstract implementation details and/or hardware access from a calling program, request notifications related to identified events, query for results, and so forth. APIs 206 can also provide low-level access to radar-based object detection component 104, where a calling program can control direct or partial hardware configuration of radar-based object detection component 104. In some cases, APIs 206 provide programmatic access to input configuration parameters that configure transmit signals and/or select object recognition algorithms. These APIs enable programs, such as radar module 106, to incorporate the functionality provided by radar-based object detection component 104 into executable code. For instance, radar module 106 can call or invoke APIs 206 to register for, or request, an event notification when a particular object characteristic has been detected, enable or disable wireless gesture recognition in vehicle computing system 102, and so forth. At times, APIs 206 can access and/or include low level hardware drivers that interface with hardware implementations of radar-based object detection component 104. Alternately or additionally, APIs 206 can be used to access various algorithms that reside on radar-based object detection component 104 to configure algorithms, extract additional information (such as 3D tracking information, angular extent, reflectivity profiles from different aspects, correlations between transforms/features from different channels, etc.), change an operating mode of radar-based object detection component 104, and so forth.

Radar-based object detection component 104 represents functionality that wirelessly detects objects, such as a driver or passenger within vehicle 110, or objects external to vehicle 110. Radar-based object detection component 104 can be implemented as a chip embedded within vehicle computing system 102, such as a System-on-Chip (SoC). However, it is to be appreciated that radar-based object detection component 104 can be implemented in any other suitable manner, such as one or more Integrated Circuits (ICs), as a processor with embedded processor instructions or configured to access processor instructions stored in memory, as hardware with embedded firmware, a printed circuit board with various hardware components, or any combination thereof. Here, radar-based object detection component 104 includes radar-emitting element 208, antenna(s) 210, digital signal processing component 212, machine-learning component 214, and an object characteristics library 216, which can be used in concert to detect object characteristics using radar techniques.

Generally, radar-emitting element 208 is configured to provide a radar field. In some cases, the radar field is configured to at least partially reflect off a target object, such as a driver of vehicle 110, other passengers within vehicle 110, or objects external to vehicle 110. The radar field can also be configured to penetrate fabric or other obstructions and reflect from human tissue. These fabrics or obstructions can include wood, glass, plastic, cotton, wool, nylon and similar fibers, and so forth, while reflecting from human tissues, such as a person's body, or a part of the person's body, such as a hand, face, and so forth.

A radar field can be a small size, such as 0 or 1 millimeters to 1.5 meters, or an intermediate size, such as 1 to 30 meters. It is to be appreciated that these sizes are merely for discussion purposes, and that any other suitable range can be used. When the radar field has an intermediate size, radar-based object detection component 104 is configured to receive and process reflections of the radar field to detect large-body movements based on reflections from human tissue caused by body, arm, or leg movements. In this way, user actions, such as texting, reaching into a glove compartment, or talking with other passengers, may be detected. In other cases, the radar field can be configured to enable radar-based object detection component 104 to detect smaller and more precise movements, such as movement of the eyes of the driver or passenger in vehicle 110, or micro-gestures used to authenticate the driver. Radar-emitting element 208 can be configured to emit continuously modulated radiation, ultra-wideband radiation, or sub-millimeter-frequency radiation.

Antenna(s) 210 transmit and receive RF signals. In some cases, radar-emitting element 208 couples with antenna(s) 210 to transmit a radar field. As one skilled in the art will appreciate, this is achieved by converting electrical signals into electromagnetic waves for transmission, and vice versa for reception. Radar-based object detection component 104 can include any suitable number of antennas in any suitable configuration. For instance, any of the antennas can be configured as a dipole antenna, a parabolic antenna, a helical antenna, a monopole antenna, and so forth. In some embodiments, antenna(s) 210 are constructed on-chip (e.g., as part of an SoC), while in other embodiments, antenna(s) 210 are separate components, metal, hardware, etc. that attach to, or are included within, radar-based object detection component 104. An antenna can be single-purpose (e.g., a first antenna directed towards transmitting signals, a second antenna directed towards receiving signals, etc.), or multi-purpose (e.g., an antenna is directed towards transmitting and receiving signals). Thus, some embodiments utilize varying combinations of antennas, such as an embodiment that utilizes two single-purpose antennas directed towards transmission in combination with four single-purpose antennas directed towards reception. The placement, size, and/or shape of antenna(s) 210 can be chosen to enhance a specific transmission pattern or diversity scheme, such as a pattern or scheme designed to capture information about a microgesture performed by the hand. In some cases, the antennas can be physically separated from one another by a distance that allows radar-based object detection component 104 to collectively transmit and receive signals directed to a target object over different channels, different radio frequencies, and different distances. In some cases, antenna(s) 210 are spatially distributed to support triangulation techniques, while in others the antennas are collocated to support beamforming techniques. While not illustrated, each antenna can correspond to a respective transceiver path that physically routes and manages the outgoing signals for transmission and the incoming signals for capture and analysis.

Digital signal processing component 212 generally represents digitally capturing and processing a signal. For instance, digital signal processing component 212 samples analog RF signals received by antenna(s) 210 to generate digital samples that represents the RF signals, and then processes these samples to extract information about the target object. Alternately or additionally, digital signal processing component 212 controls the configuration of signals generated and transmitted by radar-emitting element 208 and/or antenna(s) 210, such as configuring a plurality of signals to form a specific diversity scheme like a beamforming diversity scheme. In some cases, digital signal processing component 212 receives input configuration parameters that control an RF signal's transmission parameters (e.g., frequency channel, power level, etc.), such as through APIs 206. In turn, digital signal processing component 212 modifies the RF signal based upon the input configuration parameter. At times, the signal processing functions of digital signal processing component 212 are included in a library of signal processing functions or algorithms that are also accessible and/or configurable via APIs 206. Thus, digital signal processing component 212 can be programmed or configured via APIs 206 (and a corresponding programmatic interface of radar-based gesture detection component 104) to dynamically select algorithms and/or dynamically reconfigure. Digital signal processing component 212 can be implemented in hardware, software, firmware, or any combination thereof.

Among other things, machine-learning component 214 receives information processed or extracted by digital signal processing component 212, and uses that information to classify or recognize various aspects of the target object. In some cases, machine-learning component 214 applies one or more algorithms to probabilistically determine an action of a driver or passenger based on an input signal and previously learned object characteristic features corresponding to the action. As in the case of digital signal processing component 212, machine-learning component 214 can include a library of multiple machine-learning algorithms, such as a Random Forrest algorithm, deep learning algorithms (i.e. artificial neural network algorithms, convolutional neural net algorithms, etc.), clustering algorithms, Bayesian algorithms, and so forth. Machine-learning component 214 can be trained on how to identify various object characteristics corresponding to user action using input data that consists of example user actions to learn. In turn, machine-learning component 214 uses the input data to learn what features can be attributed to a specific action. These features are then used to identify when the specific action occurs. In some embodiments, APIs 206 can be used to configure machine-learning component 214 and/or its corresponding algorithms. Thus, machine-learning component 214 can be configured via APIs 206 (and a corresponding programmatic interface of radar-based object detection component 104) to dynamically select algorithms and/or dynamically reconfigure.

Object characteristics library 216 represents data used by digital signal processing component 212 and/or machine-learning component 214 to identify a target object and/or detect known actions or gestures performed by the driver or passenger, or known external objects. For instance, object characteristics library 216 can store signal characteristics, characteristics about a target object that are discernable from a signal, or a customized machine-learning model that can be used to identify a user action, unique in-the-air gesture, a user identity, user presence, and so forth. In addition, certain data stored in object characteristics library 216 may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

Figure 3:
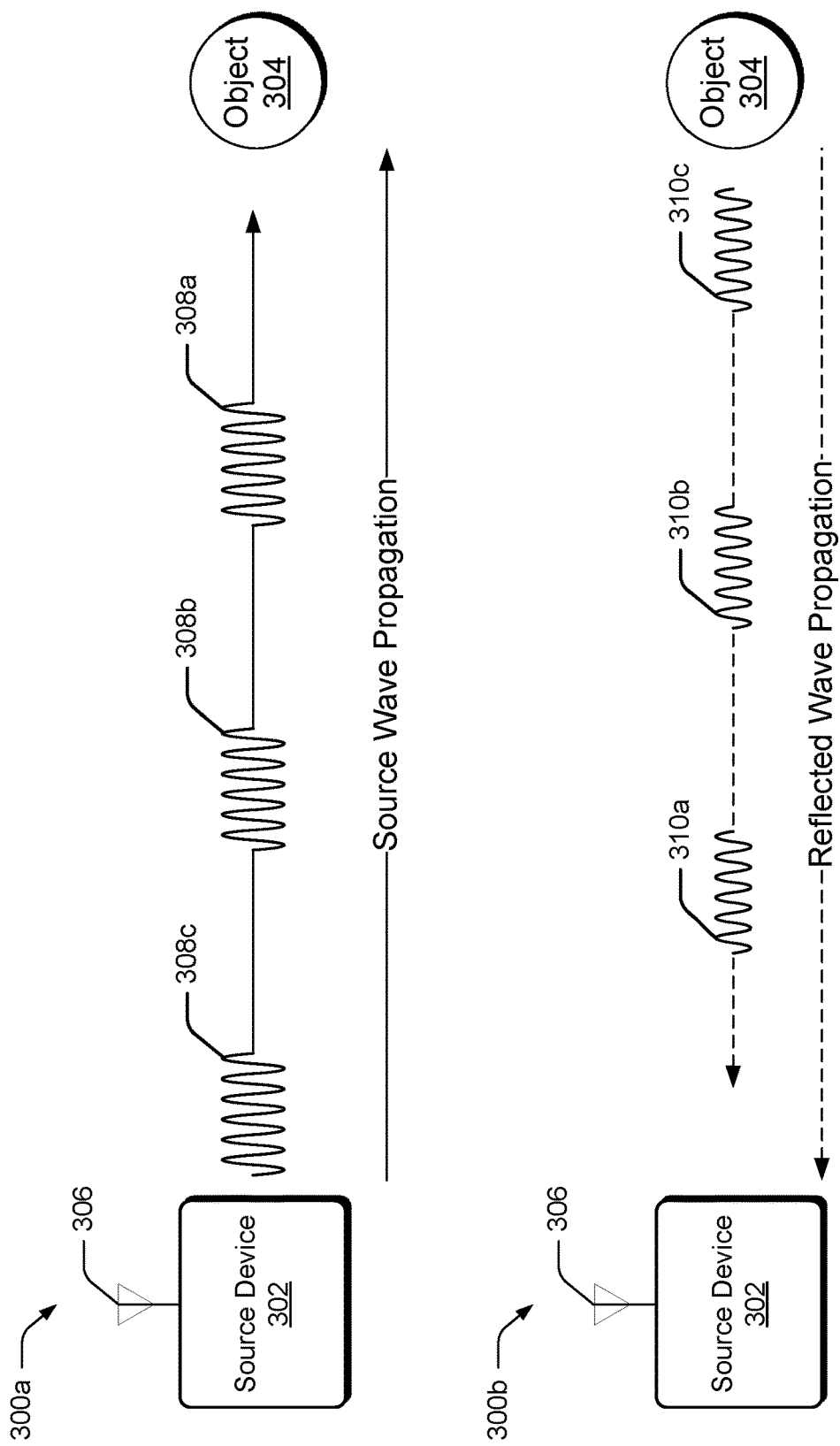
FIG. 3 illustrates an example of RF wave propagation, and a corresponding reflected wave propagation.

FIG. 3 illustrates an example of RF wave propagation, and a corresponding reflected wave propagation. It is to be appreciated that the following discussion has been simplified, and is not intended to describe all technical aspects of RF wave propagation, reflected wave propagation, or detection techniques.

Environment 300a includes source device 302 and object 304. Object 304, for example, could be a driver or passenger in vehicle 110, or an external object (e.g., a pedestrian, other vehicle, or foreign object). Source device 302 includes antenna 306, which generally represents functionality configured to transmit and receive electromagnetic waves in the form of an RF signal. It is to be appreciated that antenna 306 can be coupled to a source, such as a radar-emitting element, to achieve transmission of a signal. In this example, source device 302 transmits a series of RF pulses, illustrated here as RF pulse 308a, RF pulse 308b, and RF pulse 308c. As indicated by their ordering and distance from source device 302, RF pulse 308a is transmitted first in time, followed by RF pulse 308b, and then RF pulse 308c. For discussion purposes, these RF pulses have the same pulse width, power level, and transmission periodicity between pulses, but any other suitable type of signal with alternate configurations can be transmitted without departing from the scope of the claimed subject matter.

Generally speaking, electromagnetic waves can be characterized by the frequency or wavelength of their corresponding oscillations. Being a form of electromagnetic radiation, RF signals adhere to various wave and particle properties, such as reflection. When an RF signal reaches an object, it will undergo some form of transition. Specifically, there will be some reflection off the object. Environment 300*b* illustrates the reflection of RF pulses 308*a*-308*c* reflecting off of object 304, where RF pulse 310*a* corresponds to a reflection originating from RF pulse 308*a* reflecting off of object 304, RF pulse 310*b* corresponds to a reflection originating from RF pulse 310*b*, and so forth. In this simple case, source device 302 and object 304 are stationary, and RF pulses 308*a*-308*c* are transmitted via a single antenna (antenna 306) over a same RF channel, and are transmitted directly towards object 304 with a perpendicular impact angle. Similarly, RF pulses 310*a*-310*c* are shown as reflecting directly back to source device 302, rather than with some angular deviation. However, as one skilled in the art will appreciate, these signals can alternately be transmitted or reflected with variations in their transmission and reflection directions based upon the configuration of source device 302, object 304, transmission parameters, variations in real-world factors, and so forth. Upon receiving and capturing RF pulses 310*a*-310*c*, source device 302 can then analyze the pulses, either individually or in combination, to identify characteristics related to object 304. For example, source device 302 can analyze all of the received RF pulses to obtain temporal information and/or spatial information about object 304. Accordingly, source device 302 can use knowledge about a transmission signal's configuration (such as pulse widths, spacing between pulses, pulse power levels, phase relationships, and so forth), and further analyze a reflected RF pulse to identify various characteristics about object 304, such as size, shape, movement speed, movement direction, surface smoothness, material composition, and so forth.

Figure 4:
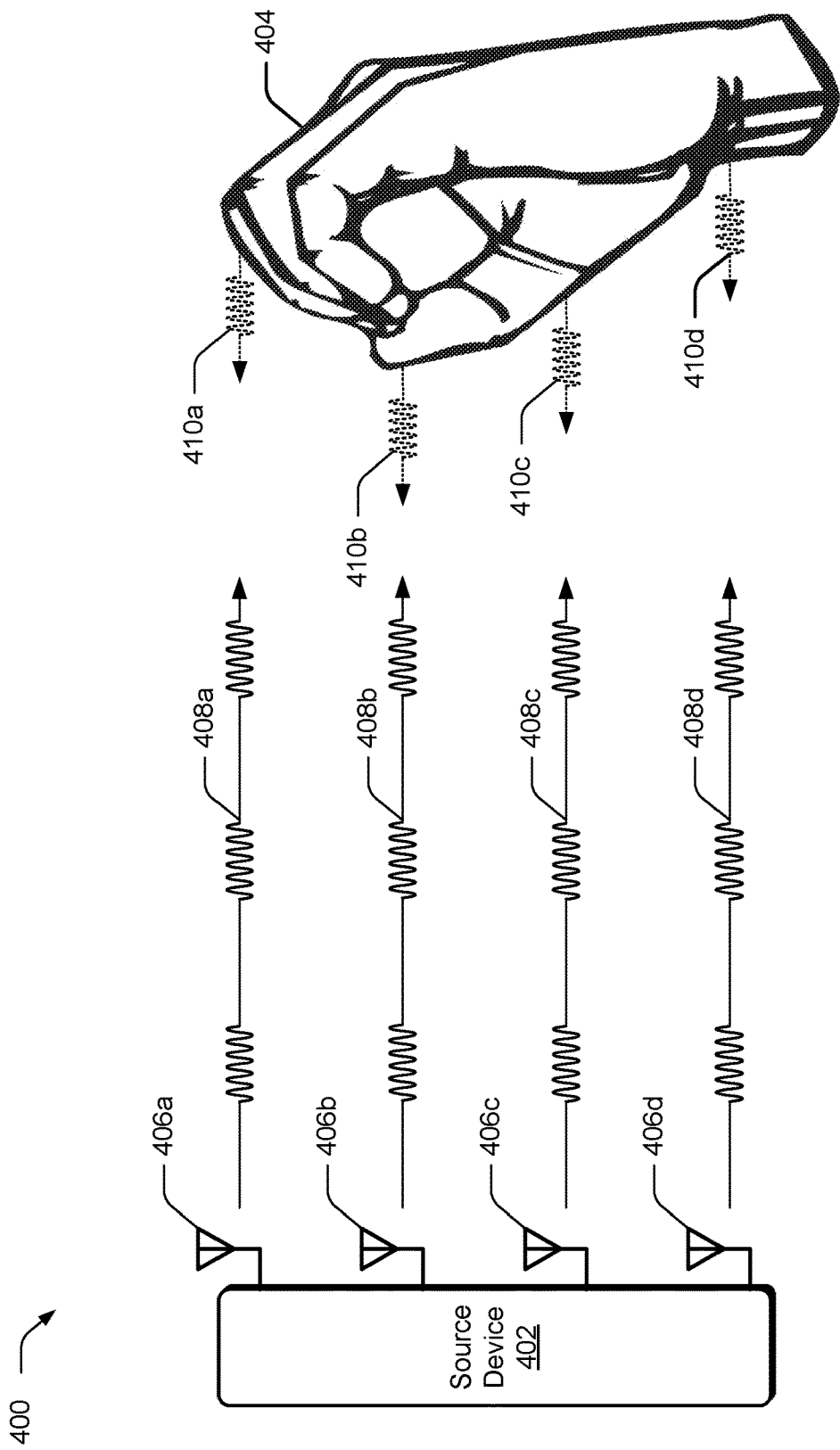
FIG. 4 illustrates an example environment in which multiple antenna are used to ascertain information about a target object.

Now consider FIG. 4, which builds upon the above discussion of FIG. 3. FIG. 4 illustrates example environment 400 in which multiple antenna are used to ascertain information about a target object. Environment 400 includes source device 402 and a target object, shown here as hand 404. It is to be appreciated, however, that similar techniques may also be applied to other target objects, such as a driver or passenger in vehicle 110, or an external object. Generally speaking, source device 402 includes antennas 406*a*-406*d* to transmit and receive multiple RF signals. In some embodiments, source device 402 includes radar-based object detection component 104, and antennas 406*a*-406*d* correspond to antennas 208. While source device 402 in this example includes four antennas, it is to be appreciated that any suitable number of antennas can be used. Each antenna of antennas 406*a*-406*d* is used by source device 402 to transmit a respective RF signal (e.g., antenna 406*a* transmits RF signal 408*a*, antenna 406*b* transmits RF signal 408*b*, and so forth). As discussed above, these RF signals can be configured to form a specific transmission pattern or diversity scheme when transmitted together. For example, the configuration of RF signals 408*a*-408*d*, as well as the placement of antennas 406*a*-406*d* relative to a target object, can be based upon beamforming techniques to produce constructive interference or destructive interference patterns, or alternately configured to support triangulation techniques. At times, source device 402 configures RF signals 408*a*-408*d* based upon an expected information extraction algorithm, as further described below.

When RF signals 408*a*-408*d* reach hand 404, they generate reflected RF signals 410*a*-410*d*. Similar to the discussion of FIG. 4 above, source device 402 captures these reflected RF signals, and then analyzes them to identify various properties or characteristics of hand 404, such as a particular action or micro-gesture. For instance, in this example, RF signals 408*a*-408*d* are illustrated with the bursts of the respective signals being transmitted synchronously in time. In turn, and based upon the shape and positioning of hand 404, reflected signals 410*a*-410*d* return to source device 402 at different points in time (e.g., reflected signal 410*b* is received first, followed by reflected signal 410*c*, then reflected signal 410*a*, and then reflected signal 410*d*). Reflected signals 410*a*-410*d* can be received by source device 402 in any suitable manner. For example, antennas 406*a*-406*d* can each receive all of reflected signals 410*a*-410*d*, or receive varying subset combinations of reflected signals 410*a*-410*d* (i.e. antenna 406*a* receives reflected signal 410*a* and reflected signal 410*d*, antenna 406*b* receives reflected signal 410*a*, reflected signal 410*b*, and reflected signal 410*c*, etc.). Thus, each antenna can receive reflected signals generated by transmissions from another antenna. By analyzing the various return times of each reflected signal, source device 402 can determine shape and corresponding distance information associated with hand 404. When reflected pulses are analyzed over time, source device 402 can additionally discern movement. Thus, by analyzing various properties of the reflected signals, as well as the transmitted signals, various information about hand 404 can be extracted, as further described below. It is to be appreciated that the above example has been simplified for discussion purposes, and is not intended to be limiting.

As in the case of FIG. 3, FIG. 4 illustrates RF signals 408*a*-508*d* as propagating at a 90° angle from source device 402 and in phase with one another. Similarly, reflected signals 410*a*-510*d* each propagate back at a 90° angle from hand 404 and, as in the case of RF signals 408*a*-508*d*, are in phase with one another. However, as one skilled in the art will appreciate, more complex transmission signal configurations, and signal analysis on the reflected signals, can be utilized, examples of which are provided above and below. In some embodiments, RF signals 408*a*-508*d* can each be configured with different directional transmission angles, signal phases, power levels, modulation schemes, RF transmission channels, and so forth. These differences result in variations between reflected signals 410*a*-510*d*. In turn, these variations each provide different perspectives of the target object which can be combined using data fusion techniques to yield a better estimate of hand 404, how it is moving, its 3-dimentional (3D) spatial profile, a corresponding micro-gesture, etc.

Example Procedures

Figure 5:
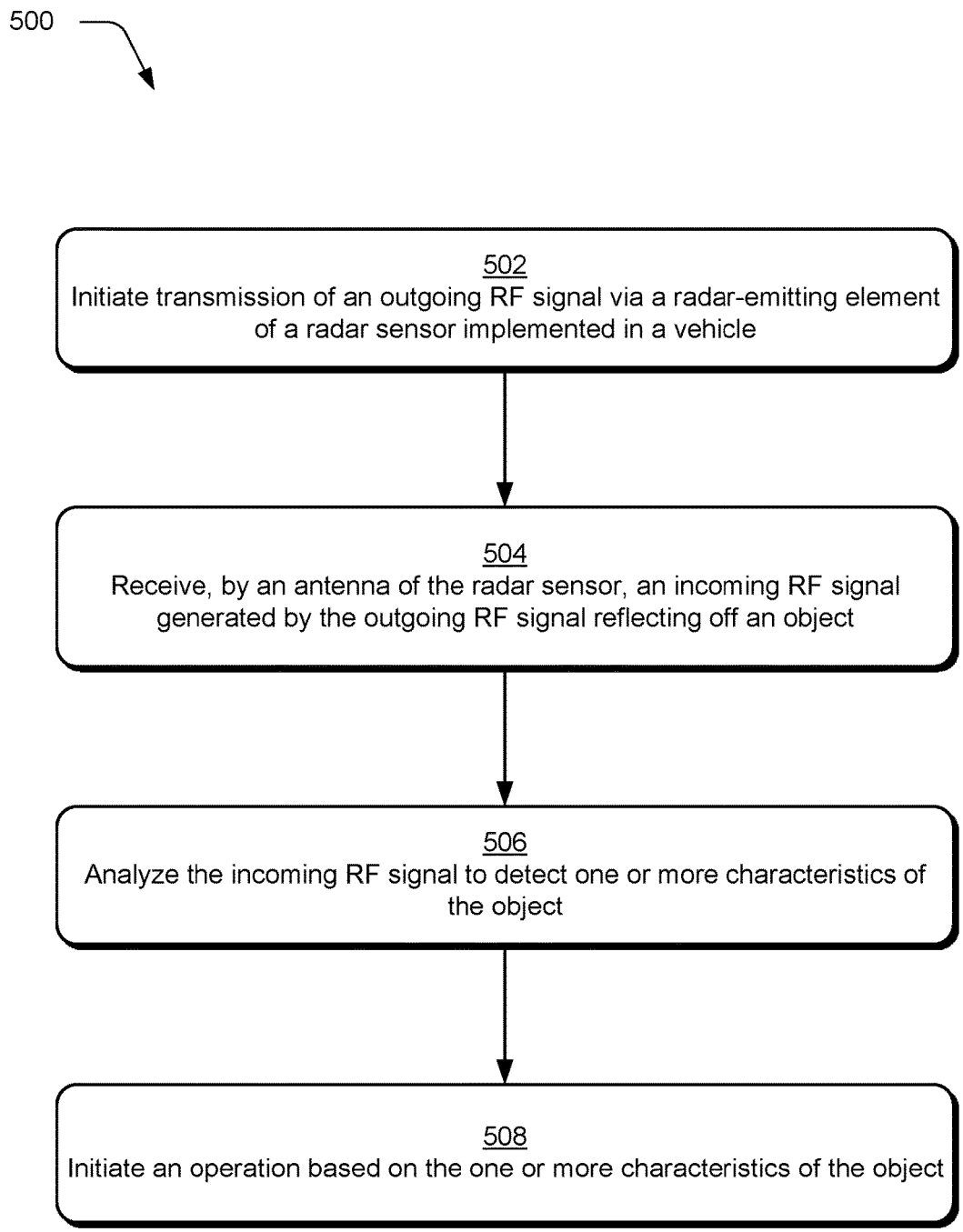
FIG. 5 is a flow diagram depicting a procedure in an example implementation.

FIG. 5 is a flow diagram depicting a procedure 500 in an example implementation. The following discussion describes techniques that may be implemented utilizing the previously described systems and devices. Aspects of each of the procedure may be implemented in hardware, firmware, software, or a combination thereof. The procedure is shown as a set of blocks that specify operations performed by one or more devices and are not necessarily limited to the orders shown for performing the operations by the respective blocks.

Transmission of an outgoing RF signal is initiated via a radar-emitting element of a radar sensor implemented in a vehicle (block 902). For example, radar module 106 initiates transmission of an outgoing RF signal via radar-emitting element 208 of radar sensor 112 implemented in vehicle 110.

An incoming RF signal generated by the outgoing RF signal reflecting off an object is received by an antenna of the radar sensor (block 904). For example, antenna 210 of radar sensor 112 receives an incoming RF signal generated by the outgoing RF signal reflecting off an object, such as a driver or passenger within vehicle 110, or an object external to the vehicle 110.

The incoming RF signal is analyzed to detect one or more characteristics of the object (block 906). For example, radar module 106 may analyze the incoming RF signal to detect one or more characteristics of the driver, passenger, or external object.

Based on the detected one or more characteristics of the object, an operation is initiated (block 908). For example, the radar module 106 may determine an activity of the driver of the vehicle 110, based on the detected characteristics, and then initiate an operation based on the activity of the driver. Other examples include providing operations based on detected characteristics of passengers in the vehicle, authenticating the driver based on detected biometric characteristics or gestures, and controlling the vehicle based on the detection of external objects.

Example Vehicle Computing System

Figure 6:
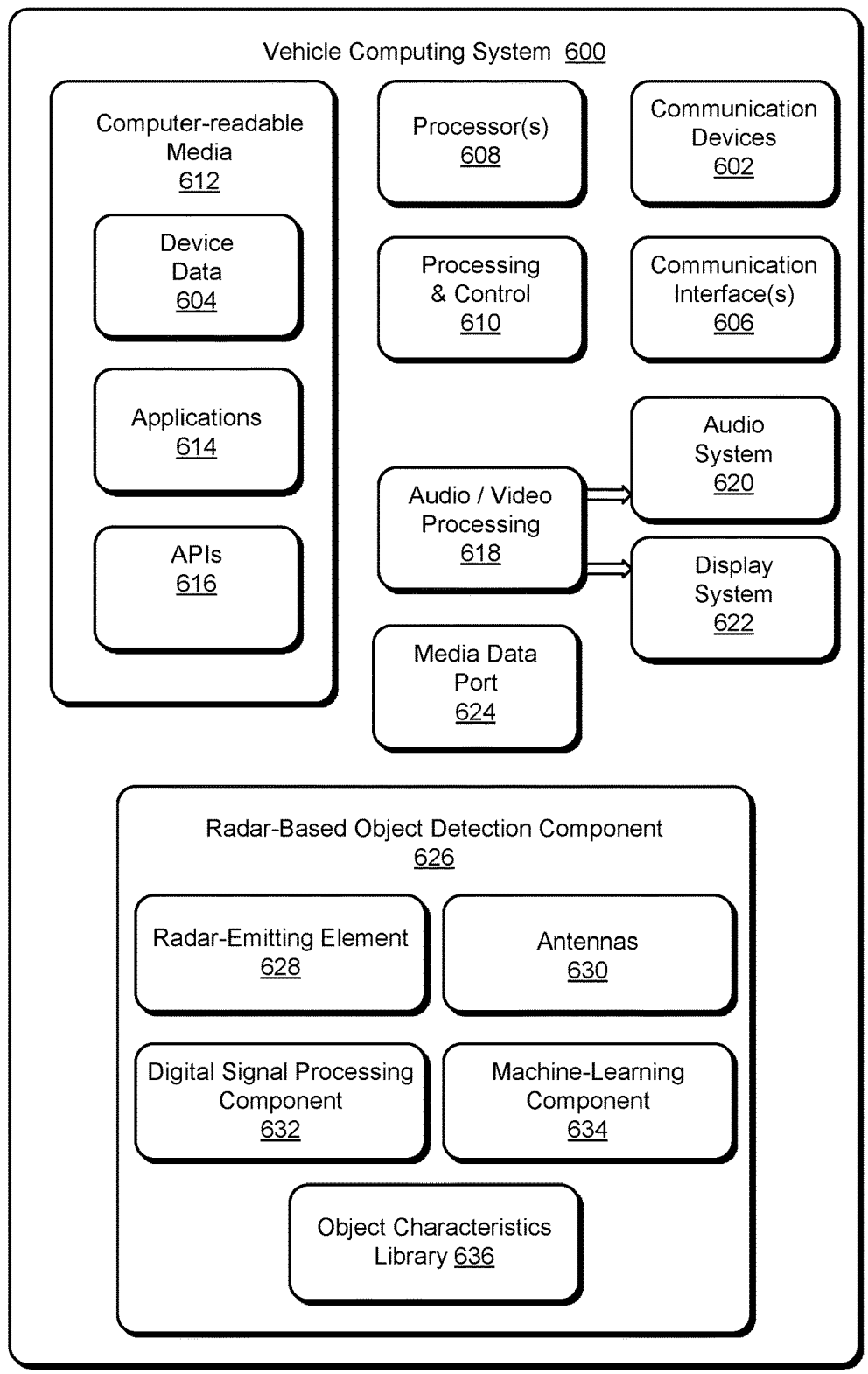
FIG. 6 illustrates various components of an example vehicle computing system that incorporates radar-based object detection for vehicles as described with reference to FIGS. 1-5.

FIG. 6 illustrates various components of an example vehicle computing system 600 that incorporates radar-based object detection for vehicles as described with reference to FIGS. 1-5 Vehicle computing system 600 may be implemented as any type of a fixed or mobile device, in any form of a consumer, computer, portable, user, communication, phone, navigation, gaming, audio, camera, messaging, media playback, and/or other type of electronic device, such as vehicle computing system 102. In light of this, it is to be appreciated that various alternate embodiments can include additional components that are not described, or exclude components that are described, with respect to vehicle computing system 600.

Vehicle computing system 600 includes communication devices 602 that enable wired and/or wireless communication of device data 604 (e.g., received data, data that is being received, data scheduled for broadcast, data packets of the data, etc.). The device data 604 or other device content can include configuration settings of the device and/or information associated with a user of the device.

Vehicle computing system 600 also includes communication interfaces 606 that can be implemented as any one or more of a serial and/or parallel interface, a wireless interface, any type of network interface, a modem, and as any other type of communication interface. The communication interfaces 606 provide a connection and/or communication links between vehicle computing system 600 and a communication network by which other electronic, computing, and communication devices communicate data with vehicle computing system 600.

Vehicle computing system 600 includes one or more processors 608 (e.g., any of microprocessors, controllers, and the like) which process various computer-executable instructions to control the operation of vehicle computing system 600 and to implement embodiments of the techniques described herein. Alternatively or in addition, vehicle computing system 600 can be implemented with any one or combination of hardware, firmware, or fixed logic circuitry that is implemented in connection with processing and control circuits which are generally identified at 610. Although not shown, vehicle computing system 600 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Vehicle computing system 600 also includes computer-readable media 612, such as one or more memory components, examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like.

Computer-readable media 612 provides data storage mechanisms to store the device data 604, as well as various applications 614 and any other types of information and/or data related to operational aspects of vehicle computing system 600. The applications 614 can include a device manager (e.g., a control application, software application, signal processing and control module, code that is native to a particular device, a hardware abstraction layer for a particular device, etc.). Computer-readable media 612 also includes APIs 616.

APIs 616 provide programmatic access to an authentication component, examples of which are provided above. The programmatic access can range from high-level program access that obscures underlying details of how a function is implemented, to low-level programmatic access that enables access to hardware. In some cases, APIs can be used to send input configuration parameters associated with modifying how signals are transmitted, received, and/or processed by an authentication component.

Vehicle computing system 600 also includes audio and/or video processing system 618 that processes audio data and/or passes through the audio and video data to audio system 620 and/or to display system 622 (e.g., a screen of a smart phone or camera). Audio system 620 and/or display system 622 may include any devices that process, display, and/or otherwise render audio, video, display, and/or image data. Display data and audio signals can be communicated to an audio component and/or to a display component via an RF link, S-video link, HDMI, composite video link, component video link, DVI, analog audio connection, or other similar communication link, such as media data port 624. In some implementations, audio system 620 and/or display system 622 are external components to vehicle computing system 600. Alternatively or additionally, display system 622 can be an integrated component of the example electronic device, such as part of an integrated touch interface.

Vehicle computing system 600 also includes a radar-based object detection component 626 that wirelessly identifies one or more features of a target object, such as a micro-gesture performed by a hand as further described above. Radar-based object detection component 626 can be implemented as any suitable combination of hardware, software, firmware, and so forth. In some embodiments, authentication component 626 is implemented as an SoC. Among other things, radar-based object detection component 626 includes radar-emitting element 628, antennas 630, digital signal processing component 632, machine-learning component 634, and object characteristics library 636.

Radar-emitting element 628 is configured to provide a radar field. In some cases, the radar field is configured to at least partially reflect off a target object. The radar field can also be configured to penetrate fabric or other obstructions and reflect from human tissue. These fabrics or obstructions can include wood, glass, plastic, cotton, wool, nylon and similar fibers, and so forth, while reflecting from human tissues, such as a person's hand. Radar-emitting element 628 works in concert with antennas 630 to provide the radar field.

Antenna(s) 630 transmit and receive RF signals under the control of authentication component 626. Each respective antenna of antennas 630 can correspond to a respective transceiver path internal to authentication component 626 that physical routes and manages outgoing signals for transmission and the incoming signals for capture and analysis as further described above.

Digital signal processing component 632 digitally processes RF signals received via antennas 630 to extract information about the target object. This can be high-level information that simply identifies a target object, or lower level information that identifies a particular micro-gesture performed by a hand. In some embodiments, digital signal processing component 632 additionally configures outgoing RF signals for transmission on antennas 630. Some of the information extracted by digital signal processing component 632 is used by machine-learning component 634. Digital signal processing component 632 at times includes multiple digital signal processing algorithms that can be selected or deselected for an analysis, examples of which are provided above. Thus, digital signal processing component 632 can generate key information from RF signals that can be used to determine what gesture might be occurring at any given moment. At times, an application, such those illustrated by applications 614, can configure the operating behavior of digital signal processing component 632 via APIs 616.

Machine-learning component 634 receives input data, such as a transformed raw signal or high-level information about a target object, and analyzes the input date to identify or classify various features contained within the data. As in the case above, machine-learning component 634 can include multiple machine-learning algorithms that can be selected or deselected for an analysis. Among other things, machine-learning component 634 can use the key information generated by digital signal processing component 632 to detect relationships and/or correlations between the generated key information and previously learned gestures to probabilistically decide which gesture is being performed. At times, an application, such those illustrated by applications 614, can configure the operating behavior of machine-learning component 632 via APIs 616.

Object characteristics library 636 represents data used by radar-based object detection component 626 to identify a target object and/or gestures performed by the target object. For instance, object characteristics library 216 can store signal characteristics, or characteristics about a target object that are discernable from a signal, that can be used to identify a user action, a unique in-the-air gesture, biometric characteristics, a user identity, user presence, and so forth. In addition, certain data stored in object characteristics library 636 may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

Although the embodiments have been described in language specific to structural features and/or methodological acts, it is to be understood that the various embodiments defined in the appended claims are not necessarily limited to the specific features or acts described. Rather, the specific features and acts are disclosed as example forms of implementing the various embodiments.

What is claimed is:

1. A radar-based object detection component implemented in a vehicle, the radar-based object detection component comprising:
   at least one radar sensor positioned within an interior of the vehicle, the at least one radar sensor comprising at least one radar-emitting element and at least one antenna; and
   a radar module implemented at least partially in hardware and configured to authenticate a driver of the vehicle by:
      receiving, via the antenna, an incoming RF signal generated by an outgoing RF signal emitted by the radar-emitting element of the radar sensor reflecting off a portion of the driver that is performing at least one gesture;
      determining the gesture based on the incoming RF signal;
      comparing the determined gesture to stored gestures corresponding to known persons permitted to drive the vehicle; and
      authenticating the driver as a known person permitted to drive the vehicle based on the determined gesture matching one of the stored gestures.

2. The radar-based object detection component of claim 1, wherein the radar module is further configured to cause the vehicle to allow the driver to drive the vehicle based on the authenticating.

3. The radar-based object detection component of claim 1, further comprising at least one radar sensor configured to detect one or more characteristics of a passenger in the vehicle, and wherein the radar module is further configured to:
   determine an activity of the passenger based on the one or more detected characteristics of the passenger; and
   initiate an operation based on the determined activity of the passenger.

4. The radar-based object detection component of claim 1, further comprising at least one radar sensor positioned on an exterior of the vehicle and configured to detect characteristics of external objects, and wherein a vehicle controller of the vehicle is configured to control navigation of the vehicle based on the detected characteristics of the external objects.

5. The radar-based object detection component of claim 1, wherein the authenticating the driver is further based on at least one detected biometric characteristic of the driver that is determined from the radar sensor.

6. The radar-based object detection component of claim 5, wherein the authenticating the driver is further based on comparing the detected biometric characteristic to stored biometric characteristics corresponding to the known persons permitted to drive the vehicle.

7. The radar-based object detection component of claim 5, wherein the detected biometric characteristics comprise a height or skeletal structure.

8. The radar-based object detection component of claim 7, wherein the height or skeletal structure is used to determine whether the driver is a child or an adult.

9. A method comprising:
- initiating transmission of an outgoing RF signal via at least one radar-emitting element implemented within at least one radar sensor of a vehicle;
- receiving, via at least one antenna of the radar sensor, an incoming RF signal generated by the outgoing RF signal reflecting off a portion of the driver that is performing at least one gesture;
- determining the gesture based on the incoming RF signal;
- comparing the determined gesture to stored gestures corresponding to known persons permitted to drive the vehicle; and
- authenticating the driver as a known person permitted to drive the vehicle based on the determined gesture matching one of the stored gestures.

10. The method of claim 9, further comprising allowing the driver to drive the vehicle based on the authenticating.

11. The method of claim 9, further comprising:
- detecting one or more characteristics of a passenger in the vehicle;
- determining an activity of the passenger based on the detected characteristics of the passenger; and
- initiating an operation based on the determined activity of the passenger.

12. The method of claim 9, further comprising:
- detecting characteristics of external objects; and
- controlling navigation of the vehicle based on the detected characteristics of the external objects.

13. The method of claim 9, wherein the authenticating the driver is further based on at least one detected biometric characteristic of the driver that is determined from the radar sensor.

14. The method of claim 13, wherein the authenticating the driver is further based on comparing the detected biometric characteristic to stored biometric characteristics corresponding to the known persons permitted to drive the vehicle.

15. The method of claim 13, wherein the detected biometric characteristics comprise a height or skeletal structure.

16. The method of claim 15, wherein the height or skeletal structure is used to determine whether the driver is a child or an adult.

17. A vehicle comprising:
- a vehicle controller configured to provide an autonomous driving mode for the vehicle;
- a radar-based object detection component comprising:
  - at least one interior radar sensor positioned within an interior of the vehicle and configured to detect a series of gestures performed by a driver of the vehicle, and at least one exterior radar sensor positioned on an exterior of the vehicle and configured to detect characteristics of external objects; and
  - a radar module implemented at least partially in hardware and configured to communicate control signals to the vehicle controller to allow the driver to operate the vehicle based on the detected gestures of the driver matching a predefined series of gestures corresponding to a known driver.

18. The vehicle of claim 17, wherein:
- the radar sensor is further configured to detect at least one biometric characteristic of the driver; and
- the communication of the control signals to the vehicle controller to allow the driver to operate the vehicle is further based on the detected biometric characteristic of the driver.

19. The vehicle of claim 17, wherein the detected gestures of the driver are compared to a plurality of series of gestures corresponding to respective known drivers.

20. The vehicle of claim 17, wherein the detected gestures are recognized as three-dimensional "in-the-air" gestures performed by the driver.

* * * * *